(12) United States Patent
Onishi

(10) Patent No.: US 10,601,240 B2
(45) Date of Patent: Mar. 24, 2020

(54) CONTROL DEVICE, ELECTRONIC APPARATUS, AND CONTACTLESS POWER TRANSMISSION SYSTEM

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 17 days.

(21) Appl. No.: 15/572,473

(22) PCT Filed: May 13, 2016

(86) PCT No.: PCT/JP2016/002342
§ 371 (c)(1),
(2) Date: Nov. 7, 2017

(87) PCT Pub. No.: WO2016/181656
PCT Pub. Date: Nov. 17, 2016

(65) Prior Publication Data
US 2018/0152041 A1    May 31, 2018

(30) Foreign Application Priority Data
May 13, 2015 (JP) ................. 2015-098044

(51) Int. Cl.
*H02J 50/10* (2016.01)
*H02J 7/02* (2016.01)
(Continued)

(52) U.S. Cl.
CPC ............ *H02J 7/025* (2013.01); *H01M 10/44* (2013.01); *H02J 1/00* (2013.01); *H02J 7/00* (2013.01);
(Continued)

(58) Field of Classification Search
USPC ........................................... 320/108
See application file for complete search history.

(56) References Cited

U.S. PATENT DOCUMENTS 8,026,694 B2   9/2011 Kamijo et al.
8,054,036 B2   11/2011 Onishi et al.
(Continued)

FOREIGN PATENT DOCUMENTS

EP   2 615 712 A2   7/2013
EP   2 894 755 A1   7/2015
(Continued)

OTHER PUBLICATIONS

Jul. 5, 2016 International Search Report issued in International Patent Application No. PCT/JP2016/002342.
(Continued)

*Primary Examiner* — Robert Grant
(74) *Attorney, Agent, or Firm* — Oliff PLC

(57) ABSTRACT

A control device, an electronic apparatus, a contactless power transmission system, and the like that can suppress deterioration in battery characteristics caused by recharging and realize power saving or the like. A control device on a power receiving side in a contactless power transmission system including a power transmitting device and a power receiving device includes: a charging unit that charges a battery based on power received by a power receiving unit that receives power from the power transmitting device; a discharging unit that performs an operation of discharging the battery and supplies the power from the battery to a power supply target; and a control unit that controls the discharging unit. The control unit starts the discharging operation of the discharging unit after an output voltage
(Continued)

(VCC) of the power receiving unit has decreased and a start-up period (TST) of the discharging operation has elapsed.

11 Claims, 19 Drawing Sheets

(51) Int. Cl.
　　　H02J 50/80　　(2016.01)
　　　H02J 1/00　　(2006.01)
　　　H01M 10/44　　(2006.01)
　　　H02J 7/00　　(2006.01)
　　　H02J 50/12　　(2016.01)
　　　H02M 7/217　　(2006.01)
　　　H02J 7/34　　(2006.01)

(52) U.S. Cl.
　　　CPC ......... *H02J 7/0068* (2013.01); *H02J 7/0072* (2013.01); *H02J 50/10* (2016.02); *H02J 50/12* (2016.02); *H02J 50/80* (2016.02); *H02M 7/217* (2013.01); *H02J 7/345* (2013.01)

(56) References Cited

U.S. PATENT DOCUMENTS

| | | |
|---|---|---|
| 2008/0197804 A1 | 8/2008 | Onishi et al. |
| 2009/0127936 A1* | 5/2009 | Kamijo ............... H02J 7/025 307/104 |
| 2015/0097442 A1* | 4/2015 | Muurinen ........... H04B 5/0037 307/104 |
| 2016/0197507 A1* | 7/2016 | Blanc ................ H02J 50/10 307/20 |

FOREIGN PATENT DOCUMENTS

| | | |
|---|---|---|
| FR | 3 009 658 A1 | 2/2015 |
| JP | S53-005959 A | 1/1978 |
| JP | 4494426 B2 | 6/2010 |
| JP | 4743173 B2 | 8/2011 |
| JP | 2012-204921 A | 10/2012 |
| JP | 2014-050270 A | 3/2014 |
| WO | 2014/034523 A1 | 3/2014 |

OTHER PUBLICATIONS

Jan. 7, 2019 extended European Search Report issued in European Patent Application No. 16792383.

\* cited by examiner

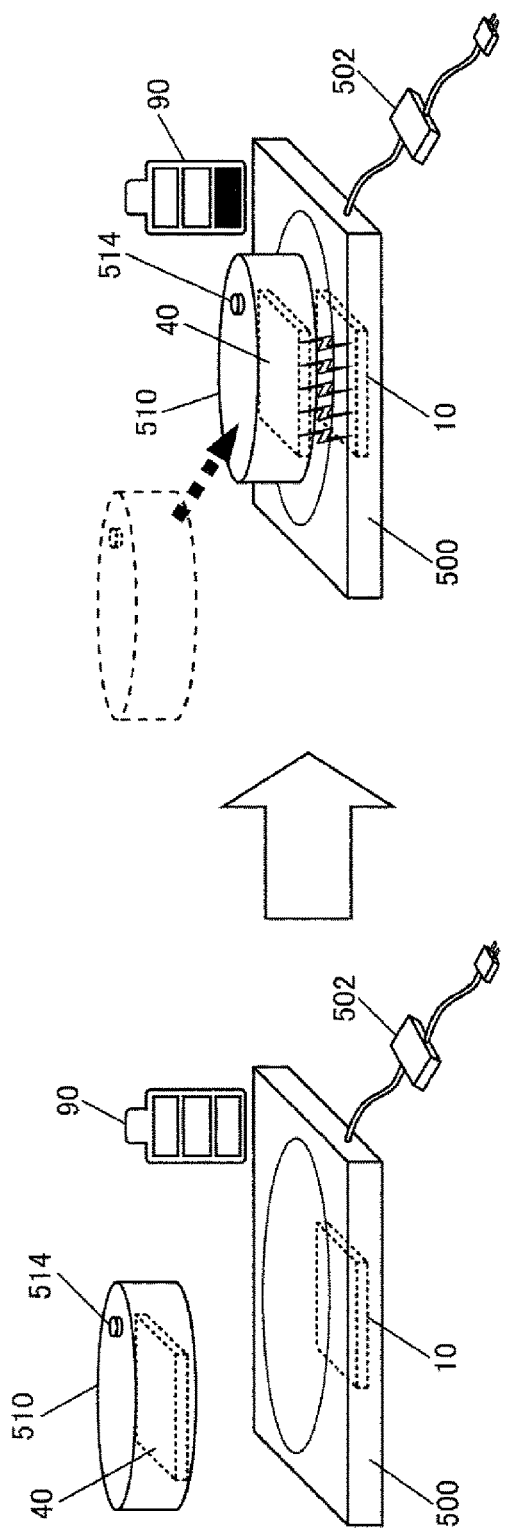
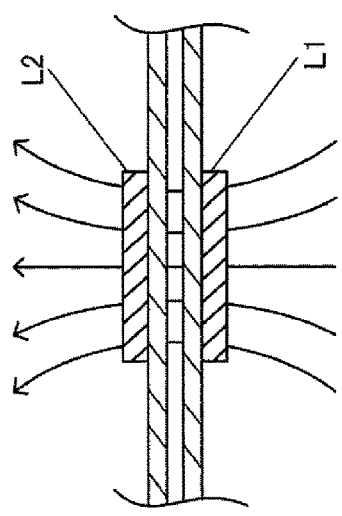

| PRIMARY COIL DRIVE VOLTAGE (POWER TRANSMITTING SIDE) | | | | | |
|---|---|---|---|---|---|
| XPOR | | | | | |
| CHARGING SYSTEM CIRCUITS | RESET | OPERATING | RESET | OPERATING | RESET |
| TD1 | OFF | ON | OFF | ON | OFF |
| TD2 | ON | OFF | ON | OFF | ON |
| CST | DISCHARGING | CHARGING | DISCHARGING | CHARGING | DISCHARGING |

FIG. 10

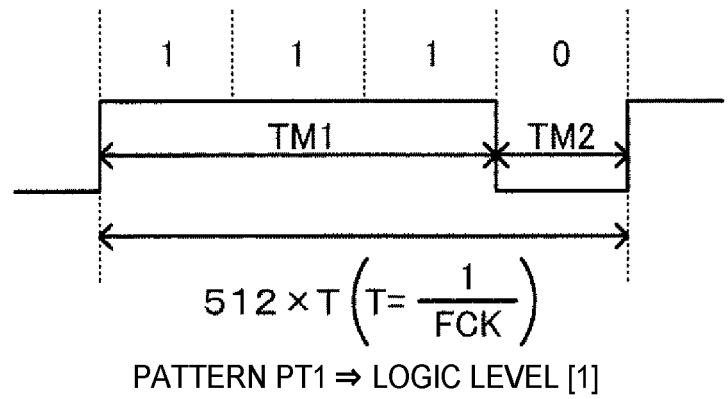
PATTERN PT1 ⇒ LOGIC LEVEL [1]
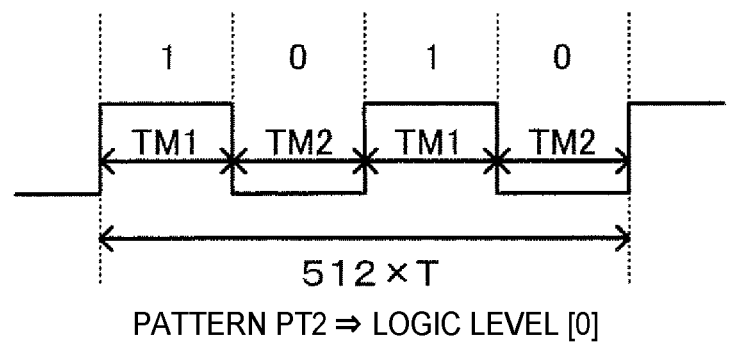
PATTERN PT2 ⇒ LOGIC LEVEL [0]
FIG. 16

FIG. 18A

| 16bit | 16bit | 16bit | 16bit |
|---|---|---|---|
| 00h | (1) DATA CODE +RECTIFICATION VOLTAGE | (2)(3)(4)(5)(6)(7) | (8)CRC |

FIG. 18B

| | bit15 | bit0 |
|---|---|---|
| (1) | DATA CODE | RECTIFICATION VOLTAGE |
| (2) | TEMPERATURE ||
| (3) | CHARGE VOLTAGE ||
| (4) | CHARGE CURRENT ||
| (5) | STATUS FLAG ||
| (6) | NUMBER OF CYCLES ||
| (7) | IC NUMBER ||
| (8) | CRC ||

CONTROL DEVICE, ELECTRONIC APPARATUS, AND CONTACTLESS POWER TRANSMISSION SYSTEM

TECHNICAL FIELD

The present invention relates to a control device, an electronic apparatus, a contactless power transmission system, and the like.

BACKGROUND ART

In recent years, much attention has been paid to contactless power transmission (wireless power transfer) in which electromagnetic induction is used to make power transmission possible without a metal contact. Charging of electronic apparatuses such as a household appliance and a mobile terminal has been proposed as an application example of the contactless power transmission.

Known technologies of the contactless power transmission include technologies disclosed in Patent Documents 1 and 2, for example. For example, in the known technology in Patent Document 1, when full charge of a battery is detected, normal power transmission to the power receiving device is stopped, and power saving power transmission is performed. In the power saving power transmission, power that is lower than the power in the normal power transmission and with which the operating state of a charging control device that manages charging of the battery can be maintained is transmitted.

CITATION LIST

Patent Literature

Patent Document 1: Japanese patent No. 4,494,426
Patent Document 1: Japanese patent No. 4,743,173

SUMMARY OF INVENTION

Technical Problem

In the contactless power transmission so far, when a power transmitting device stops normal power transmission after detecting that a battery is fully charged, the power receiving device enters a state in which power is discharged from the battery. When the battery voltage has decreased by a given voltage or more, recharging of the battery is performed.

However, when deterioration in the cycle characteristic of the battery (cell) is considered, it is ideal that the discharging current of the battery after being fully charged is ideally zero. If recharging is performed more than necessary, deterioration in the cycle characteristic is accelerated. Also, in the contactless power transmission, power consumption in a waiting period in which the power transmitting device performs intermittent power transmission is desirably suppressed to a minimum.

According to some aspects of the invention, a control device, an electronic apparatus, a contactless power transmission system, and the like that can suppress the deterioration in battery characteristics caused by recharging and realize power saving or the like can be provided.

Solution to Problem

One aspect of the invention relates to a control device on a power receiving side in a contactless power transmission system including a power transmitting device and a power receiving device. The control device includes: a charging unit that charges a battery based on power received by a power receiving unit that receives power from the power transmitting device; a discharging unit that performs an operation of discharging the battery and supplies the power from the battery to a power supply target; and a control unit that controls the discharging unit. The control unit starts the discharging operation of the discharging unit after an output voltage of the power receiving unit has decreased and a start-up period of the discharging operation has elapsed.

According to one aspect of the invention, a discharging operation is performed in which power from the power transmitting device is received, and a battery is charged based on the received power, and power is supplied from the battery to a power supply target as well. In one aspect of the invention, a discharging operation of the discharging unit is started after an output voltage of the power receiving unit has decreased and a start-up period has elapsed. In this way, even in a case where the output voltage of the power receiving unit has decreased, the discharging operation of the battery is not performed unless the start-up period of the discharging operation has elapsed. When the start-up period has elapsed, power is discharged from the battery, and power is supplied to the power supply target. In this way, a situation in which the battery is unnecessarily discharged and recharging is performed more than necessary can be suppressed. Accordingly, deterioration in the battery characteristics caused by recharging can be suppressed. Also, since the battery is not unnecessarily discharged, power saving can be realized.

Also, in one aspect of the invention, the control unit may start the discharging operation of the discharging unit after the start-up period has elapsed after the output voltage of the power receiving unit decreased below a judgement voltage.

In this way, when power reception by the power receiving unit has stopped and the output voltage of the power receiving unit has decreased below the judgement voltage, the measurement of the start-up period can be started. When the start-up period has elapsed, the discharging operation of the discharging unit is started, and power can be supplied from the battery to the power supply target.

Also, in one aspect of the invention, the control unit may start discharging of a capacitor, which is charged when the power receiving unit is receiving power, when the output voltage of the power receiving unit has decreased below the judgement voltage, and start the discharging operation of the discharging unit when a charge voltage of the capacitor has decreased below a threshold voltage.

In this way, the elapse of the start-up period is judged using a capacitor that is charged when the power receiving unit is receiving power, and the discharging operation of the discharging unit can be started.

Also, in one aspect of the invention, the control unit includes: a first transistor for charging the capacitor; and a second transistor for discharging the capacitor. A control signal that is at a first voltage level when the output voltage of the power receiving unit is greater than or equal to the judgement voltage and at a second voltage level when the output voltage is less than the judgement voltage is input to the control unit. When the control signal is at the first voltage level, the second transistor is turned off, and the first transistor is turned on, and as a result, the capacitor is charged, and when the control signal is at the second voltage level, the first transistor is turned off, and the second transistor is turned on, and as a result, the capacitor is discharged.

In this way, the elapse of the start-up period is judged by performing charging and discharging of a capacitor using the first transistor for charging the capacitor and the second transistor for discharging the capacitor, and the discharging operation of the discharging unit can be started.

Also, in one aspect of the invention, the control signal may be a power-on reset signal.

In this way, by effectively using a signal for power-on resetting the charging system circuits, for example, start control of the discharging operation can be realized.

Also, in one aspect of the invention, the power transmitting device performs intermittent power transmission for removal detection, and the start-up period may be longer than an interval of the intermittent power transmission for removal detection.

In this way, the intermittent power transmission for removal detection and the start of the discharging operation of the battery that is started when the start-up period has elapsed can both be realized.

Also, in one aspect of the invention, the control device further includes a load modulation unit that transmits communication data to the power transmitting device by load modulation. The load modulation unit may transmit the communication data including information for causing the power transmitting device to perform intermittent power transmission for removal detection by load modulation.

In this way, the power transmitting device can be caused to perform intermittent power transmission for removal detection using communication data that is transmitted by load modulation.

Also, in one aspect of the invention, the load modulation unit may transmit the communication data including at least one of detection information regarding full charge of the battery and detection information regarding an abnormality on the power receiving side as the information for causing the power transmitting device to perform the intermittent power transmission for removal detection.

In this way, when full charge of the battery is detected or an abnormality on the power receiving side is detected, communication data including the detection information is transmitted to the power transmitting device by load modulation, and as a result, the power transmitting device can be caused to perform intermittent power transmission for removal detection.

Also, in one aspect of the invention, the control unit may stop the discharging operation of the discharging unit when landing is detected.

In this way, the discharging operation of the discharging unit is stopped when landing is detected, and as a result, the situation in which the discharging unit performs discharging unnecessarily, and power is wastefully consumed can be suppressed, and power saving can be realized.

Also, in one aspect of the invention, the control unit may cause the discharging unit to perform the discharging operation in a removed period.

In this way, power from the battery is supplied to a power supply target by causing the discharging unit to perform the discharging operation in a removed period, and normal operation or the like of the power supply target can be realized.

Also, in one aspect of the invention, the control device further includes a load modulation unit that transmits communication data to the power transmitting device by load modulation. The load modulation unit may start the load modulation when landing is detected, and stop the load modulation when removal is detected.

In this way, when landing is detected, by transmitting various pieces of information to the power transmitting device by load modulation, the power transmitting device can be caused to perform various types of processing or control. Also, by stopping the load modulation when removal is detected, the power transmitting device can be caused to continue normal power transmission or the like on the condition that the load modulation continues.

Also, in one aspect of the invention, the control unit may perform landing detection and removal detection based on the output voltage of the power receiving unit.

In this way, landing detection and removal detection can be executed by monitoring the output voltage of the power receiving unit.

Another aspect of the invention relates to an electronic apparatus including the control device according to any of the above descriptions.

Another aspect of the invention relates to a contactless power transmission system including a power transmitting device and a power receiving device. The power transmitting device transmits power to the power receiving device. The power receiving device charges a battery based on power received from the power transmitting device, and supplies power from the battery to a power supply target by performing a discharging operation of the battery. The power receiving device starts the discharging operation after an output voltage of a power receiving unit that receives power from the power transmitting device has decreased and a start-up period of the discharging operation has elapsed.

According to another aspect of the invention, the discharging operation of the battery is started after the start-up period has elapsed after the output voltage of the power receiving unit decreased. In this way, even in a case where the output voltage of the power receiving unit decreased, the discharging operation of the battery is not performed unless the start-up period of the discharging operation has elapsed. When the start-up period has elapsed, power is discharged from the battery, and power is supplied to the power supply target. In this way, the situation in which the battery is unnecessarily discharged and recharging is performed more than necessary can be suppressed. Accordingly, the deterioration in the battery characteristics or the like caused by recharging can be suppressed. Also, the battery is not discharged unnecessarily, and as a result, power saving can be realized as well.

BRIEF DESCRIPTION OF DRAWINGS

FIGS. 1A and 1B are diagrams for describing a contactless power transmission system of a present embodiment.

FIG. 10 is a signal waveform diagram for describing the discharging system control unit.

FIG. 16 is a diagram for describing a communication method of the present embodiment.

FIGS. 18A and 18B are examples of a format of communication data.

DESCRIPTION OF EMBODIMENTS

Figure 2:
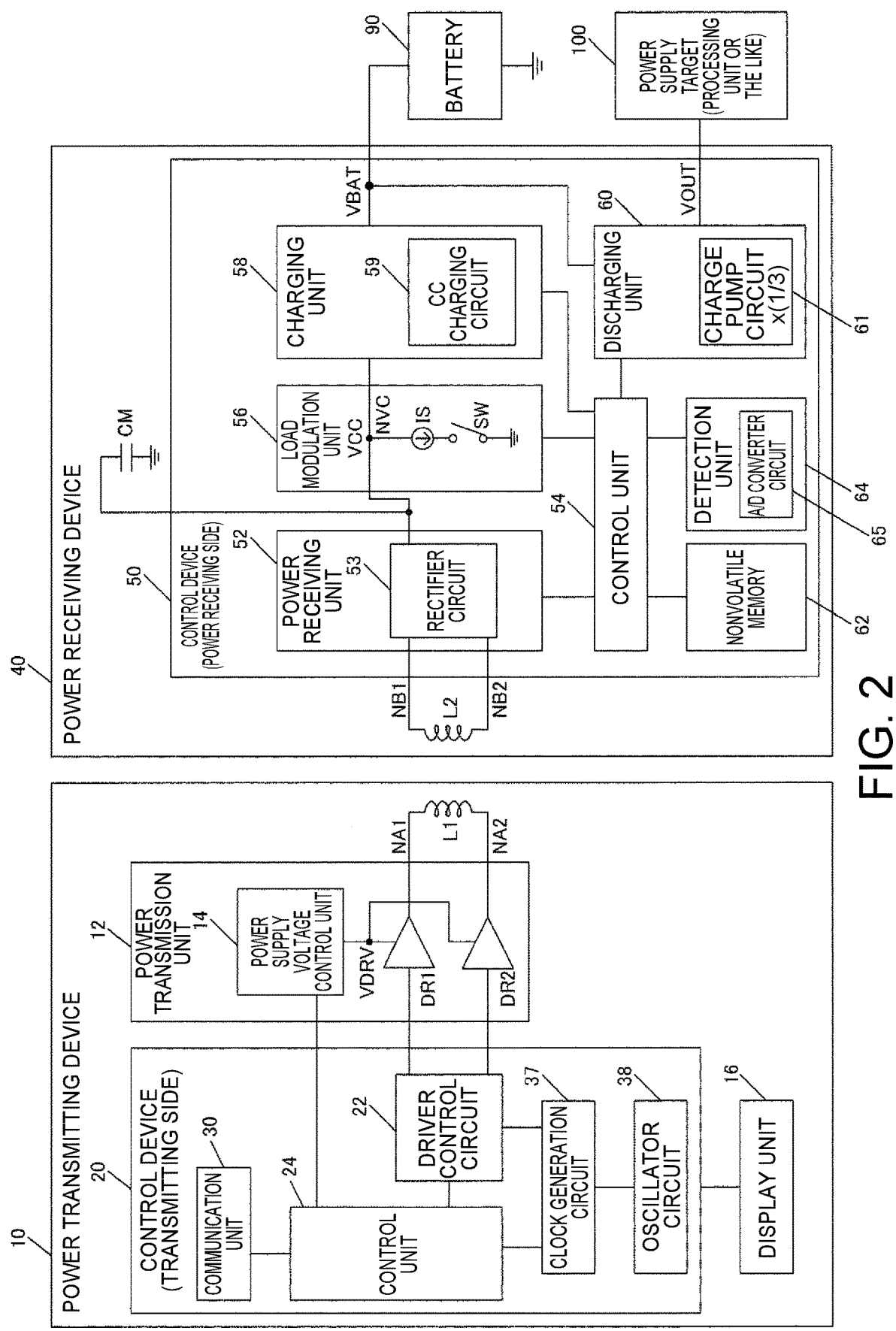
FIG. 2 is an exemplary configuration of a power transmitting device, a power receiving device, and control devices on a power transmitting side and a power receiving side of the present embodiment.

Hereinafter, a preferable embodiment of the invention will be described in detail. Note that the embodiment described below is not intended to unduly limit the content of the invention described in the scope of the claims, and not all configurations described in this embodiment are necessarily essential as solving means of the invention.

1. Electronic Apparatus

An example of a contactless power transmission system of the present embodiment is shown in FIG. 1A. A charger 500 (one of electronic apparatuses) includes a power transmitting device 10. An electronic apparatus 510 includes a power receiving device 40. Also, the electronic apparatus 510 includes an operation switch portion 514 and a battery 90. Note that, although the battery 90 is schematically illustrated in FIG. 1A, the battery 90 is, in actuality, incorporated in the electronic apparatus 510. The contactless power transmission system of the present embodiment is constituted by the power transmitting device 10 and the power receiving device 40 in FIG. 1A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus), a mobile information terminal (such as a smartphone or a cellular phone), a cordless telephone, a shaver, an electric toothbrush, a wrist computer, a handy terminal, an electric car, and an electric bicycle.

As schematically shown in FIG. 1B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible.

2. Power Transmitting Device, Power Receiving Device, Power Transmitting Side and Power Receiving Side Control Devices FIG. 2 shows an exemplary configuration of a power transmitting device 10, a power receiving device 40, a power transmitting side control device 20, and a power receiving side control device 50 of the present embodiment. Electronic apparatuses on the power transmitting side such as a charger 500 in FIG. 1A include at least the power transmitting device 10 in FIG. 2. Also, the electronic apparatus 510 on the power receiving side can include at least the power receiving device 40, the battery 90, and the power supply target 100. The power supply target 100 can be various devices such as a processing unit (such as DSP). According to the configuration in FIG. 2, a contactless power transmission (wireless power transfer) system is realized in which power is transmitted from the power transmitting device 10 to the power receiving device 40 by electromagnetically coupling the primary coil L1 and the secondary coil L2, and charging of the battery 90 and the like is performed.

The power transmitting device 10 (transmission module, primary module) includes the primary coil L1, a transmission unit 12, a display unit 16, and the control device 20. Note that the configuration of the power transmitting device 10 is not limited to the configuration in FIG. 2, and various modifications can be implemented such as omitting a portion (display unit, for example) of the constituent elements, adding another constituent element, or changing a connection relationship.

When power is to be transmitted, the transmission unit 12 generates an AC voltage of a predetermined frequency and supplies the generated AC voltage to the primary coil L1. The transmission unit 12 includes a first transmission driver DR1 that drives one end of the primary coil L1, a second transmission driver DR2 that drives the other end of the primary coil L1, and a power supply voltage control unit 14. Also, the transmission unit 12 can include at least one capacitor that constitutes a resonance circuit with the primary coil L1.

The transmission drivers DR1 and DR2 of the transmission unit 12 are each realized by an inverter circuit (buffer circuit) or the like that is constituted by a power MOS transistor, for example. These transmission drivers DR1 and DR2 are controlled (driven) by a driver control circuit 22 of the control device 20.

The power supply voltage control unit 14 in the power transmission unit 12 controls a power supply voltage VDRV of the power transmission drivers DR1 and DR2. For example, a control unit 24 controls the power supply voltage control unit 14 based on communication data received from the power receiving side. Accordingly, the power supply voltage VDRV supplied to the power transmission drivers DR1 and DR2 is controlled, and variable control of the transmitting power is realized, for example. The power supply voltage control unit 14 can be realized by a DC/DC converter or the like. For example, the power supply voltage control unit 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 and DR2. Specifically, when increasing the transmitting power from the power transmitting device 10 to the power receiving device 40, the power supply voltage control unit 14 increases the power supply voltage VDRV that is supplied to the power transmission drivers DR1 and DR2, and when decreasing the transmitting power, the power supply voltage control unit 14 decreases the power supply voltage VDRV.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 1A and 1B. On the other hand, when power transmission is not needed, the electronic apparatus 510 is physically separated from the charger 500 so as to be in a state in which the magnetic flux of the primary coil L1 does not pass through the secondary coil L2.

The display unit 16 displays various states (such as being in power transmission or ID authentication) of the contactless power transmission system using a color, an image, or the like, and can be realized by an LED, an, LCD, or the like.

The control device 20 performs various types of control on the power transmitting side, and can be realized by an integrated circuit device (IC) or the like. The control device 20 includes the driver control circuit 22, the control unit 24, and a communication unit 30. Also, the control device 20 can include a clock generation circuit 37 and an oscillator circuit 38. Note that the control device 20 is not limited to the configuration in FIG. 2, and various modifications can be implemented such as omitting a portion (such as the clock generation circuit or the oscillator circuit) of the constituent elements, adding another constituent element, or changing connection relationships. For example, a modification in which the power transmission unit 12 or the like is incorporated in the control device 20 can be implemented.

The driver control circuit 22 controls the power transmission drivers DR1 and DR2 in the power transmission unit 12 that transmits power to the power receiving device 40. For example, the driver control circuit 22 outputs a control signal (drive signal) to gates of transistors that constitute the power transmission drivers DR1 and DR2, and causes the power transmission drivers DR1 and DR2 to drive the primary coil L1.

The control unit 24 executes various types of control processing of the transmitting side control device 20. For example, the control unit 24 controls the driver control circuit 22. Specifically, the control unit 24 performs various types of sequence control and judgement processing necessary for power transmission, communication processing, and the like. The control unit 24 can be realized by a logic circuit such as a gate array that is generated by an automated place-and-route method, or various processors such as a microcomputer, for example.

The communication unit 30 performs communication processing for the communication of communication data with the power receiving device 40. For example, the communication unit 30 performs communication processing for communication with the power receiving device 40 (control device 50) that transmits communication data by load modulation. Specifically, the communication unit 30 performs processing for detecting and receiving communication data from the power receiving device 40.

The oscillator circuit 38 is constituted by a crystal-oscillator circuit or the like, and generates a clock signal for the primary side. The clock generation circuit 37 generates a drive clock signal that defines a drive frequency, or the like. Also, the driver control circuit 22 generates a control signal having a given frequency (drive frequency) based on the drive clock signal, the control signal from the control unit 24, and the like, and outputs the control signal to the power transmission drivers DR1 and DR2 in the power transmission unit 12 for control.

The power receiving device 40 (power receiving module, secondary module) includes the secondary coil L2 and the control device 50. Note that the power receiving device 40 is not limited to the configuration in FIG. 2, and various modifications can be implemented such as omitting a portion of the constituent elements, adding another constituent element, or changing connection relationships.

The control device 50 performs various types of control on the power receiving side, and is realized by an integrated circuit device (IC) or the like. The control device 50 includes a power receiving unit 52, a control unit 54, a load modulation unit 56, a charging unit 58, and a discharging unit 60. Also, the control device 50 can include a nonvolatile memory 62 and a detection unit 64. Note that the control device 50 is not limited to the configuration in FIG. 2, and various modifications can be implemented such as omitting a portion of the constituent elements, adding another constituent element, or changing connection relationships. For example, a modification is possible in which the power receiving unit 52 or the like is provided outside the control device 50.

The power receiving unit 52 receives power from the power transmitting device 10. Specifically, the receiving unit 52 converts an AC voltage induced in the secondary coil L2 to a DC rectified voltage VCC, and outputs the rectified voltage VCC. This conversion is performed by a rectifier circuit 53 included in the power receiving unit 52. The rectifier circuit 53 can be realized by a plurality of transistors, diodes, and the like.

The control unit 54 performs various types of control processing on the receiving side control device 50. For example, the control unit 54 controls a load modulation unit 56, a charging unit 58, and a discharging unit 60. Also, the control unit 54 can control the power receiving unit 52, the nonvolatile memory 62, the detection unit 64, and the like. The control unit 54 can be realized by a logic circuit such as a gate array that is generated by an automated place-and-route method, or various processors such as a microcomputer, for example.

The load modulation unit 56 performs load modulation. For example, the load modulation unit 56 includes a current source IS, and performs load modulation using the current source IS. Specifically, the load modulation unit 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control unit 54, for example, and a current (constant current) of the current source IS that flows from the node NVC to GND is caused to flow or cut off, and thereby the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation unit 56 is not limited to the configuration in FIG. 2, and various modifications such as using a resistor in place of the current source IS can be implemented.

The charging unit 58 charges (charging control) the battery 90. For example, the charging unit 58 charges the battery 90 based on the power received by the power receiving unit 52 that receives power from the power transmitting device 10. For example, the charging unit 58 is supplied with a voltage that is based on the rectified voltage VCC (DC voltage, in a broad sense) from the power receiving unit 52, and charges the battery 90. The charging unit 58 may include a CC charging circuit 59. The CC charging circuit 59 is a circuit that performs CC (Constant-Current) charging of the battery 90.

The discharging unit 60 performs a discharging operation for discharging the battery 90. For example, the discharging unit 60 (power supply unit) performs the discharging operation for discharging the battery 90, and supplies power from the battery 90 to a power supply target 100. For example, the discharging unit 60 is supplied with a charge voltage VBAT from the battery 90, and supplies an output voltage VOUT to the power supply target 100. The discharging unit 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging unit 60 (charge pump circuit) operates with the charge voltage VBAT as the power supply voltage.

The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in the electronic apparatus 510 (FIG. 1A) in which the power receiving device 40 is incorporated, and is a power supply target of the battery 90.

The nonvolatile memory 62 is a nonvolatile memory device that stores various types of information. The nonvolatile memory 62 stores various types of information such as status information of the power receiving device 40 (control device 50), for example. An EEPROM or the like can be used as the nonvolatile memory 62. A MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection unit 64 performs various detection operations. For example, the detection unit 64 performs various detection operations by monitoring the rectified voltage VCC, the charge voltage VBAT, and the like. Specifically, the detection unit 64 includes an A/D converter circuit 65, performs A/D conversion on voltages based on the rectified voltage VCC and the charge voltage VBAT, a temperature detection voltage from an unshown temperature detection unit, and the like with the A/D converter circuit 65, and executes a detection operation using the obtained digital A/D converted values. Detection of over-discharge, over-voltage, over-current, and abnormal temperature (high temperature, low temperature) are envisioned as detection operations performed by the detection unit 64. For example, over-voltage protection, high temperature protection, and low temperature protection can be realized by the detection unit 64 detecting over-voltage and abnormal temperature during the charging. Also, over-discharge protection and over-current protection can be realized by the detection unit 64 detecting over-discharge and over-current during the discharging.

In the present embodiment, the receiving side control device 50 in the contactless power transmission system includes the charging unit 58, the discharging unit 60, and the control unit 54 that controls the discharging unit 60. The control unit 54 (discharging system control unit) starts a discharging operation of the discharging unit 60 after the output voltage (VCC, VD5) of the power receiving unit 52 has decreased and a start-up period (TST) of the discharging operation has elapsed. Specifically, the control unit 54 starts the discharging operation of the discharging unit 60 after the start-up period has elapsed after the output voltage of the power receiving unit 52 decreased below a judgement voltage. Specifically, the discharging unit 60 operates by receiving a power supply voltage (VBAT itself, or a power supply voltage based on VBAT) generated from the battery voltage VBAT, and outputs the output voltage VOUT that is a power supply voltage of the power supply target 100. For example, the charge pump circuit 61 steps down the battery voltage VBAT (to a third of the input voltage, for example), and outputs the stepped down voltage as the output voltage VOUT.

Also, in the present embodiment, the power transmitting device 10 performs intermittent power transmission for removal detection. When full charge of the battery 90 is detected or an abnormality on the power receiving side is detected, for example, the power transmitting device 10 stops normal power transmission, and performs intermittent power transmission for removal detection. The start-up period of the discharging operation of the discharging unit 60 is a period that is longer than the interval of the intermittent power transmission for removal detection.

Also, the power receiving side control device 50 includes the load modulation unit 56 that transmits communication data to the power transmitting device 10 by load modulation. The load modulation unit 56 transmits communication data including information for causing the power transmitting device 10 to perform intermittent power transmission for removal detection by load modulation. Specifically, the load modulation unit 56 transmits communication data including at least one of information of detection of full charge of the battery 90 (such as a full charge flag), and information regarding detection of an abnormality on the power receiving side (such as a flag of a battery charge error, an over-voltage error, or a temperature error), as the information for causing the power transmitting device 10 to perform intermittent power transmission for removal detection.

Also, the control unit 54 (discharging system control unit) stops the discharging operation of the discharging unit 60 when landing is detected. That is, when landing of the electronic apparatus 510 is detected in FIG. 1A, the discharging operation (supply of VOUT) of the discharging unit 60 is stopped, and the power of the battery 90 is not discharged to the power supply target 100. Also, the control unit 54 causes the discharging unit 60 to perform the discharging operation in a removed period (a period in which the electronic apparatus 510 is removed). Due to this discharging operation, the power of the battery 90 is supplied to the power supply target 100 via the discharging unit 60.

Also, the load modulation unit 56 starts the load modulation when landing of the electronic apparatus 510 is detected. The power transmitting device 10 (control unit 24) starts normal power transmission with the power transmission unit 12 on the condition that the power receiving device 40 (load modulation unit 56) has started the load modulation. Also, when removal of the electronic apparatus 510 is detected, the load modulation unit 56 stops the load modulation. The power transmitting device 10 (control unit 24) continues the normal power transmission by the power transmission unit 12 while the load modulation continues. That is, when the load modulation is no longer detected, the normal power transmission is caused to stop, and the power transmission unit 12 is caused to perform intermittent power transmission for landing detection, for example. In this case, the control unit 54 on the power receiving side can perform the landing detection and the removal detection based on the output voltage (VCC) of the power receiving unit 52.

3. Operation Sequence of Contactless Power Transmission System

Figure 3:
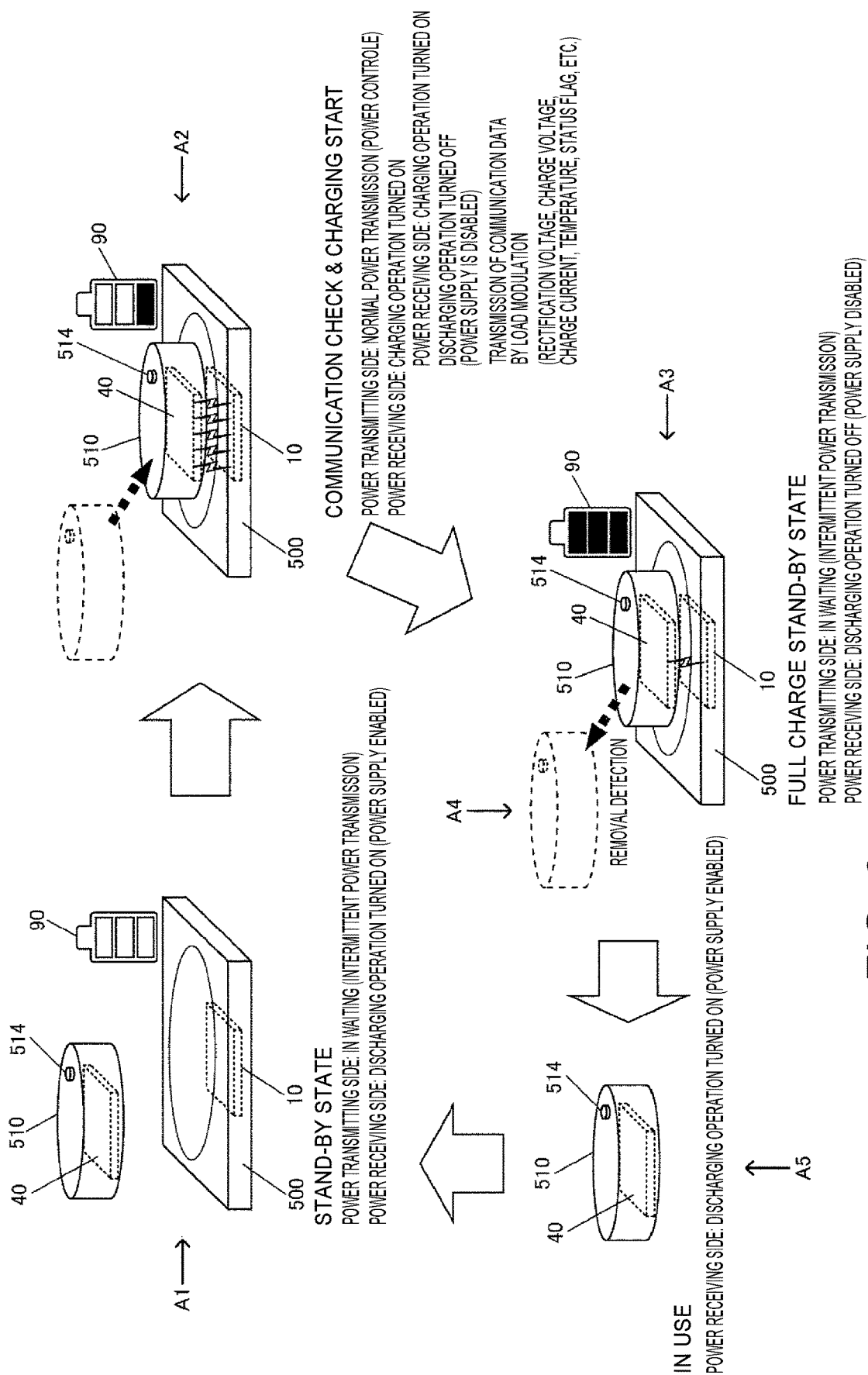
FIG. 3 is a diagram for describing an outline of an operation sequence of the contactless power transmission system of the present embodiment.

Next, an example of an operation sequence of the contactless power transmission system of the present embodiment will be described. FIG. 3 is a diagram for describing the outline of the operation sequence.

In A1 in FIG. 3, the electronic apparatus 510 including the power receiving device 40 is not placed on the charger 500 including the power transmitting device 10, and is in a removed state. In this case, a stand-by state is realized. In the stand-by state, the power transmitting side is in a waiting state, and the power receiving side is in a state where the discharging operation is turned on.

Specifically, in the stand-by state, the power transmission unit 12 of the power transmitting device 10 performs intermittent power transmission for landing detection. That is, the power transmission unit 12 is in a state in which continuous power transmission such as normal power transmission is not performed, and intermittent power transmission in which power is intermittently transmitted at given intervals is performed so as to detect landing of the electronic apparatus 510. Also, in the stand-by state, the operation for discharge to the power supply target 100 is turned on in the power receiving device 40, and power supply to the power supply target 100 is enabled. That is, the discharging unit 60 in the power receiving device 40 performs an operation of discharging the power from the battery 90 to the power supply target 100. Accordingly, the power supply target 100 such as a processing unit is supplied with the power from the battery 90, and can operate.

As shown in A2 in FIG. 3, when the electronic apparatus 510 is placed on the charger 500, and landing is detected, a communication check & charge state is realized. In the communication check & charge state, normal power transmission is performed on the power transmitting side, and the charging operation is turned on and the discharging operation is turned off on the power receiving side. Also, transmission of the communication data by load modulation is performed on the power receiving side.

Specifically, in the communication check & charge state, the power transmission unit 12 in the power transmitting device 10 performs normal power transmission which is continuous power transmission. Here, the power transmission unit 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC which is the output voltage from the power receiving unit 52. The charge state of the battery 90 can be determined based on the information such as the charge voltage VBAT.

Also, in the communication check & charge state, the charging operation of the charging unit 58 in the power receiving device 40 is turned on, and charging of the battery 90 is performed based on the power received by the power receiving unit 52. Also, the discharging operation of the discharging unit 60 is turned off, and power from the battery 90 is not supplied to the power supply target 100. Also, in the communication check & charge state, communication data is transmitted to the power transmitting side by load modulation performed by the load modulation unit 56. For example, communication data including power transmission status information (such as VCC), charge status information (such as VBAT and various status flags), and information such as a temperature is transmitted from the power receiving side to the power transmitting side by regular load modulation in a normal power transmission period. For example, power control by the power supply voltage control unit 14 in the power transmission unit 12 is performed based on the power transmission status information or the like included in the communication data.

As shown in A3 in FIG. 3, when full charge of the battery 90 is detected, a full charge stand-by state is realized. In the full charge stand-by state, the power transmitting side is in a waiting state, and the power receiving side is in a state in which the discharging operation remains off.

Specifically, the power transmission unit 12 performs intermittent power transmission for removal detection, for example. That is, the power transmission unit 12 is in a state in which continuous power transmission such as normal power transmission is not performed, and intermittent power transmission in which power is intermittently transmitted at given intervals is performed so as to detect removal of the electronic apparatus 510. Also, the discharging operation of the discharging unit 60 remains off, and the power supply to the power supply target 100 remains to be disabled.

When removal of the electronic apparatus 510 is detected as shown in A4 in FIG. 3, the electronic apparatus 510 is in a use state, and the discharging operation of the power receiving side is turned on, as shown in A5 in FIG. 3.

Specifically, the discharging operation of the discharging unit 60 is switched from off to on, and the power from the battery 90 is supplied to the power supply target 100 via the discharging unit 60. Accordingly, power from the battery 90 is supplied, the power supply target 100 such as a processing unit operates with the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A1 in FIG. 3. Also, when landing is detected, the discharging operation of the discharging unit 60 is stopped. In this regular load modulation, communication data including information for controlling power on the power transmitting side, and information representing status on the power receiving side is transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging unit 60 remains off.

Also, in the present embodiment, when full charge of the battery 90 is detected, normal power transmission is stopped, and intermittent power transmission for removal detection is performed, as shown in A3 in FIG. 3. When removal is detected and a removed period begins, the discharging operation of the discharging unit 60 is performed, as shown in A4 and A5. Accordingly, power from the battery 90 is supplied to the power supply target 100, and normal operation of the electronic apparatus 510 becomes possible. Note that landing detection and removal detection are performed based on the output voltage (rectified voltage VCC, for example) of the power receiving unit 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and a normal operation of the power supply target 100 such as a processing unit (DSP) becomes possible. In this way, an operation sequence of preferable contactless power transmission can be realized in a type of electronic apparatus 510 (electronic apparatus such as a hearing aid that is worn by a user) that does not operate in the charge period during which the electronic apparatus 510 is placed on the charger 500, for example. That is, energy saving can be realized in such a type of electronic apparatus 510 as a result of the discharging operation to discharge power from the battery 90 being turned off in the charge period (normal power transmission period). As a result of the discharging operation being automatically turned on when removal is detected, power from the battery 90 is supplied to various devices that are power supply targets 100 of the electronic apparatus 510 so that the devices can operate, and the electronic apparatus 510 can automatically shift to a normal operation mode.

Figure 4:
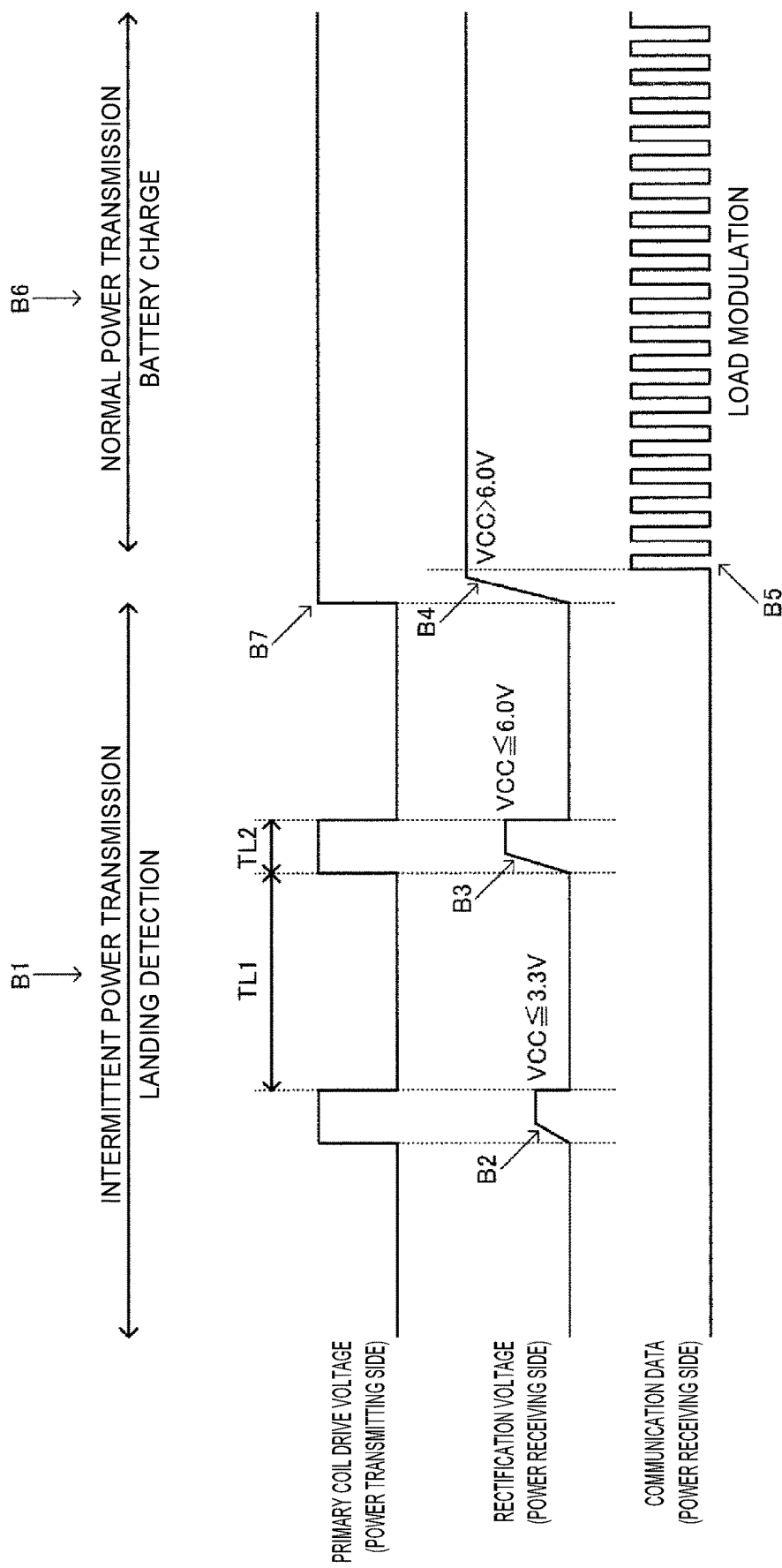
FIG. 4 is a signal waveform diagram for describing an operation sequence of the present embodiment.
Figure 5:
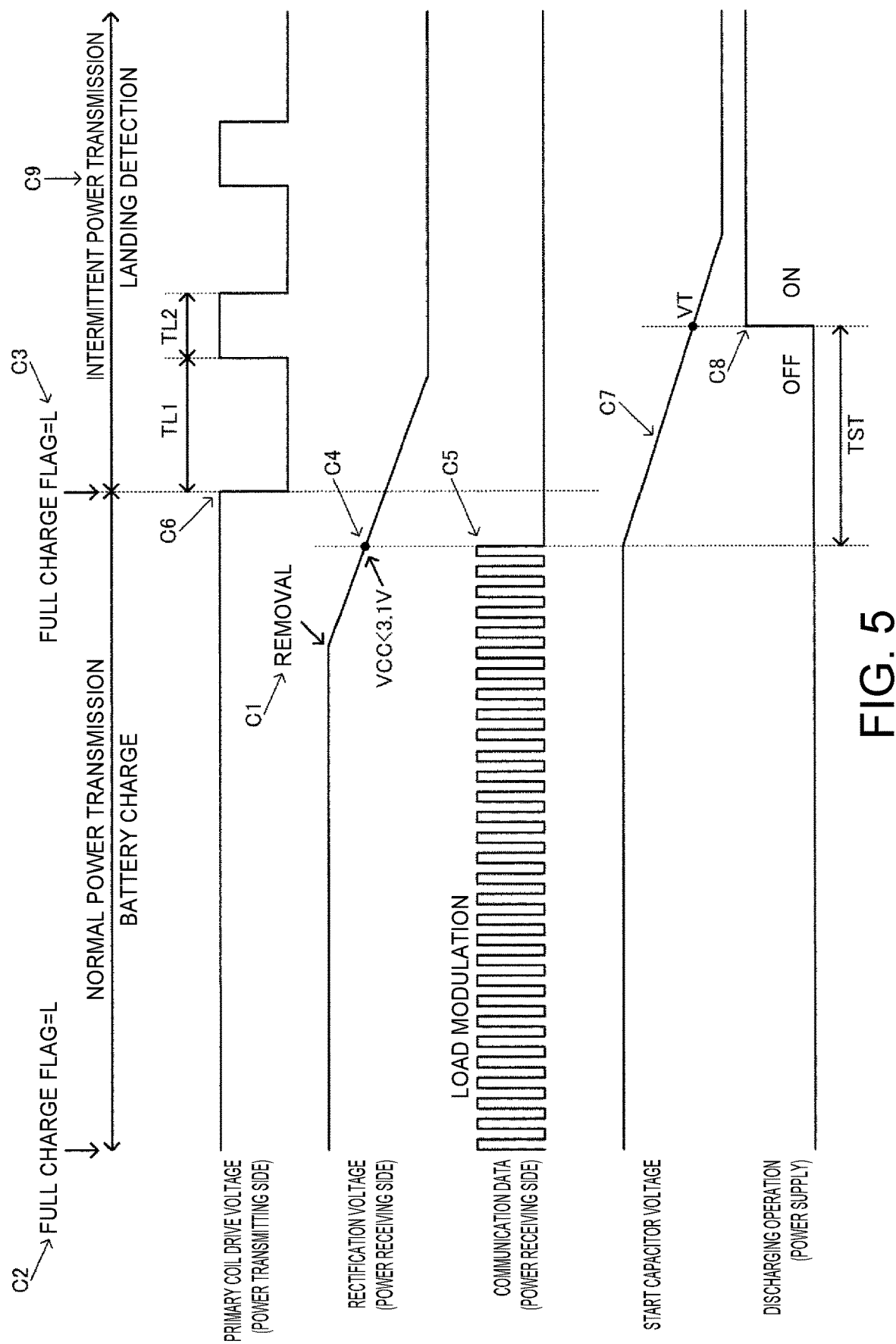
FIG. 5 is a signal waveform diagram for describing an operation sequence of the present embodiment.
Figure 6:
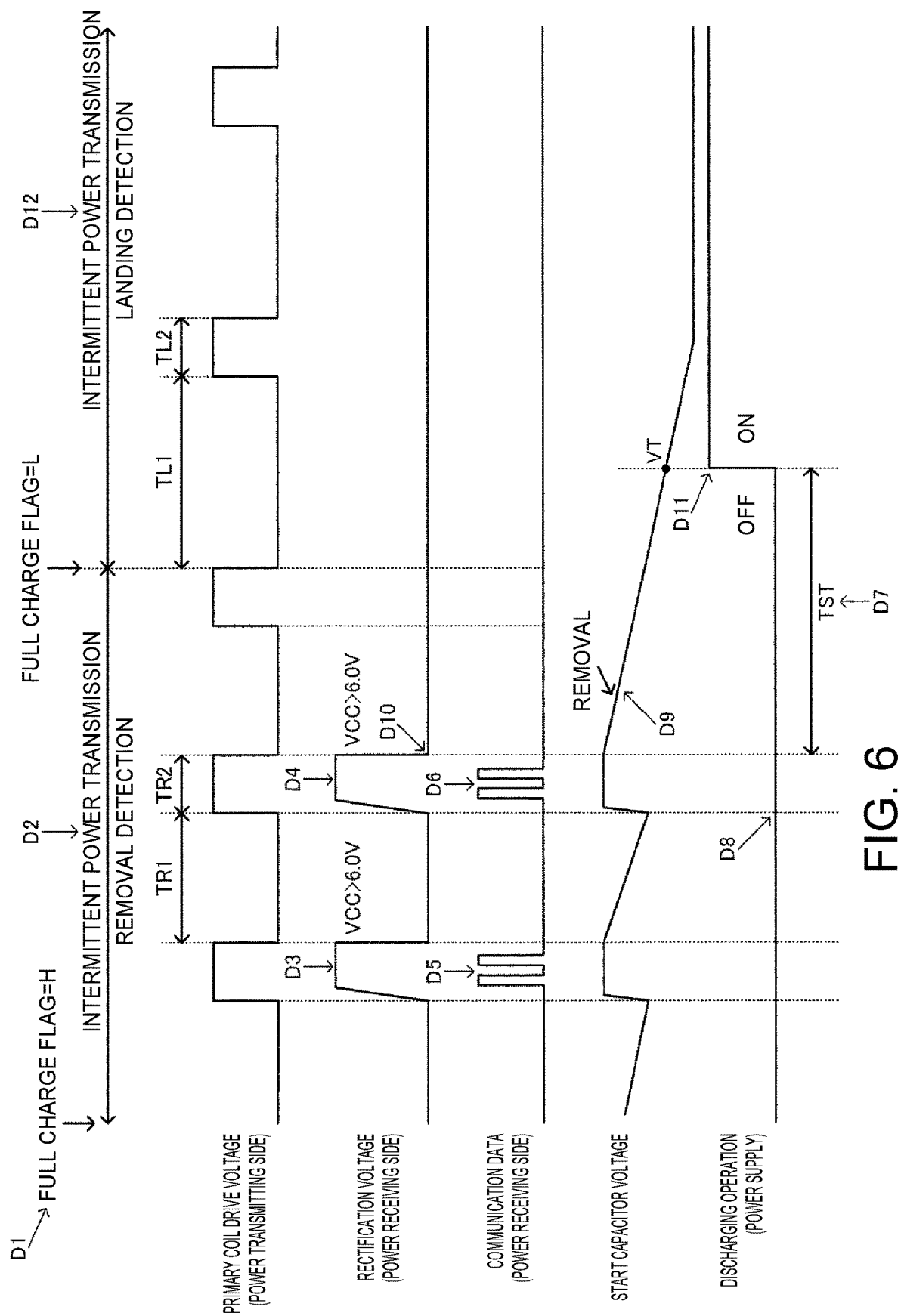
FIG. 6 is a signal waveform diagram for describing an operation sequence of the present embodiment.

FIGS. 4 to 6 are signal waveform diagrams for describing an operation sequence of the contactless power transmission system of the present embodiment.

B1 in FIG. 4 is the stand-by state in A1 in FIG. 3, and intermittent power transmission for landing detection is performed. That is, power transmission of a period TL2 is performed at the intervals of a period TL1. The period of TL1 is 3 s for example, and the period of TL2 is 50 ms for example. In B2 and B3 in FIG. 4, the rectified voltage VCC that is the output voltage of the power receiving unit 52 is less than or equal to 6.0 V, and therefore, communication by load modulation is not performed.

On the other hand, in B4, the rectified voltage VCC exceeds 6.0 V that is the threshold voltage for landing detection, and therefore the load modulation unit 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 1B. Accordingly, the rectified voltage VCC increases and exceeds 6.0 V, and load modulation is started. Then, when this load modulation (null communication data) is detected on the power transmitting side, normal power transmission by the power transmission unit 12 is started as shown in B6. The normal power transmission in B6 is continuous power transmission that is different from the intermittent power transmission in B1, and charging of the battery 90 by the charging unit 58 is started by the power received due to the normal power transmission. At this time, a discharging operation of the discharging unit 60 is turned off. Also, the communication data including various types of information such as the rectified voltage, the charge voltage, or the status flag is transmitted from the power receiving side to the power transmitting side by the load modulation shown in B5, and power transmission control is executed. Note that the start of the load modulation in B5 is triggered by the increase of the rectified voltage VCC due to the intermittent power transmission for landing detection shown in B7.

In C1 in FIG. 5, the electronic apparatus 510 is removed in the normal power transmission period during which charging of the battery 90 is performed. The removal in C1 is a removal before the battery 90 is fully charged, as shown in C2 and C3. That is, it is a removal in a state in which a full charge flag is at a low level that is an inactive level.

When the electronic apparatus 510 is removed in this way, the power on the power transmitting side is not transmitted to the power receiving side, and the rectified voltage VCC which is the output voltage of the power receiving unit 52 decreases. Then, when VCC has decreased below 3.1 V, for example, as shown in C4, load modulation by the load modulation unit 56 is stopped, as shown in C5. When load modulation is stopped, normal power transmission by the power transmission unit 12 is stopped, as shown in C6.

Also, when the rectified voltage VCC (output voltage) decreases below 3.1 V, for example, which is a judgement voltage, discharge of a start capacitor (CST in FIG. 8) on the power receiving side is started. The start capacitor is a capacitor for starting up the discharging operation (for measurement of a start-up period) on the power receiving side, and is provided as a component external to the receiving side control device 50, for example. When a start-up period TST elapses after the rectified voltage VCC has decreased below the judgement voltage (3.1 V), the discharging operation of the discharging unit 60 is switched from off to on, as shown in C8, and power from the battery 90 starts to be supplied to the power supply target 100. Specifically, when the voltage of the start capacitor (charge voltage) decreases below a threshold voltage for turning on the discharging operation, a start-up period TST is determined to have elapsed, the discharging operation of the discharging unit 60 is turned on, and power from the battery 90 is discharged to the power supply target 100. Accordingly, the electronic apparatus 510 is in a usable state, as shown in A5 in FIG. 3. Also, the power transmission unit 12 starts to perform intermittent power transmission for landing detection, as shown in C9, after normal power transmission is stopped.

In D1 in FIG. 6, the full charge flag is at a high level which is an active level, and the full charge of the battery 90 is detected. When the full charge is detected in this way, the state is shifted to the full charge stand-by state, as shown in A3 in FIG. 3, and the intermittent power transmission for removal detection after full charge is performed, as shown in D2. That is, power transmission is performed during the period TR2 at the intervals of the period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC in the power receiving unit 52 increases above 6.0 V due to the intermittent power transmission for removal detection, as shown in D3 and D4 in FIG. 6, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC of the power receiving unit 52 decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging unit 60 is switched from off to on, and power from the battery 90 begins to be supplied to the power supply target 100. Also, as shown in D12, intermittent power transmission for landing detection of the electronic apparatus 510 begins to be performed.

Figure 7:
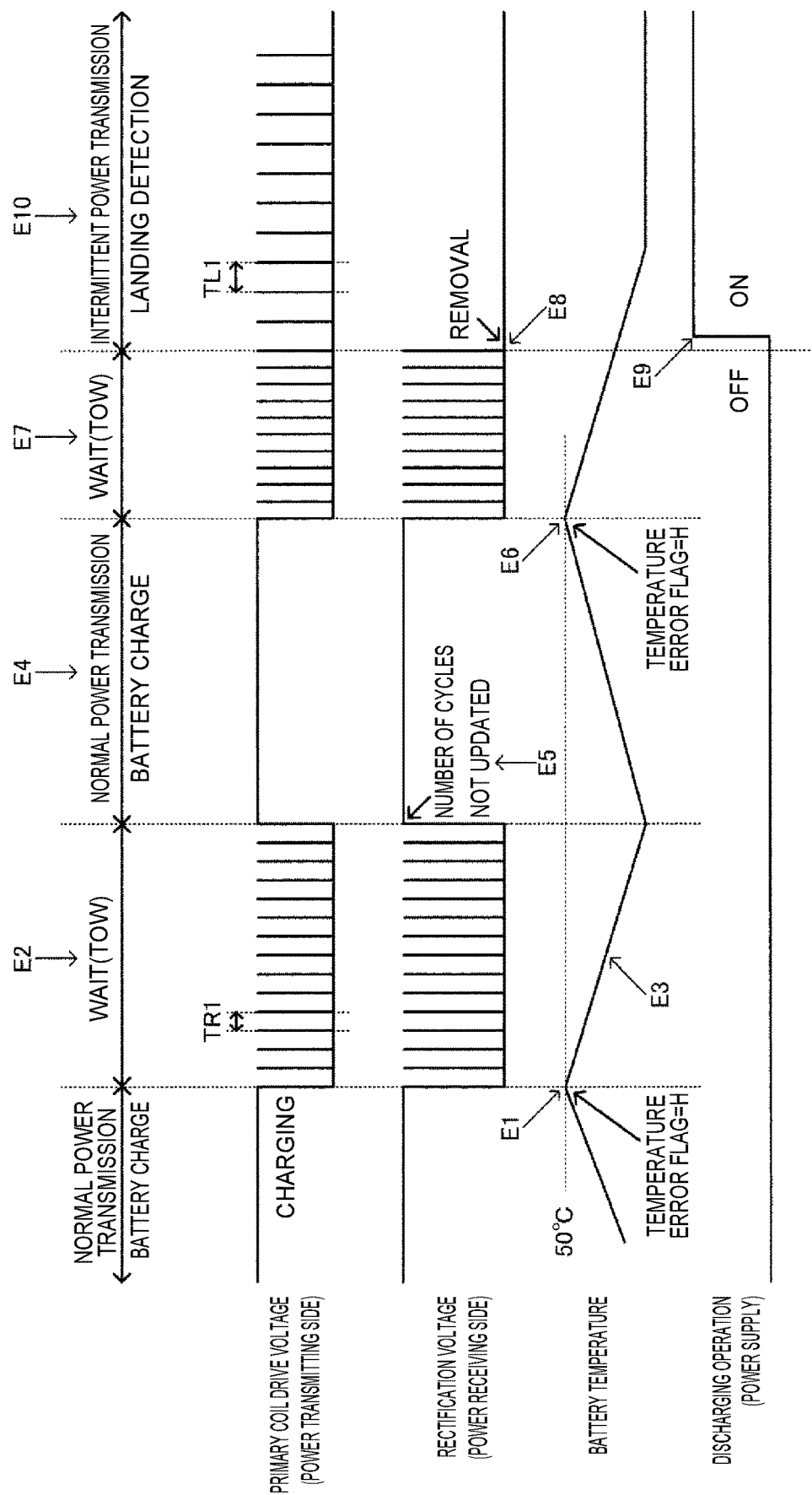
FIG. 7 is a signal waveform diagram for describing an operation sequence of the present embodiment.

FIG. 7 is a signal waveform diagram for describing the operation sequence in an overall wait state due to an abnormal temperature (temperature error).

In E1 in FIG. 7, abnormal temperature (high temperature abnormality) whereby the battery temperature has reached 50° C. is detected, for example, and the temperature error flag is set to a high level, which is an active level. In the present embodiment in this case, an overall waiting period TOW is set as shown in E2. In the waiting period TOW, normal power transmission is suspended, and intermittent power transmission for removal detection is performed, for example. That is, the intermittent power transmission similar to that in the full charge stand-by state described in FIG. 6 is performed. For example, communication data including the temperature error flag is transmitted from the power receiving side by load modulation to the power transmitting side, and therefore normal power transmission of the power transmission unit 12 is suspended, and intermittent power transmission is started.

The length of the waiting period TOW is 5 minutes, for example, normal power transmission which is continuous power transmission is not performed in the waiting period TOW, and the battery 90 is not charged. Accordingly, heat is dissipated from the battery 90, and the battery temperature decreases, as shown in E3 in FIG. 7. Then, when the waiting period TOW has elapsed, normal power transmission is re-started and charging of the battery 90 is re-started, as shown in E4. At this time, in the present embodiment, update processing of the number of cycles that represents the number of charging times is not performed, as shown in E5. That is, because repetition of battery charging caused by an abnormal temperature should not be included in the number of charging times, update processing in which the number of cycles (cycle times) is incremented by 1 is not performed.

In E6 in FIG. 7, the battery temperature again reaches 50° C., and the temperature error flag is set to a high level. Accordingly, the waiting period TOW shown in E7 is set, normal power transmission is suspended, and intermittent power transmission is started to be performed.

In E8 in FIG. 7, the electronic apparatus 510 is removed. When the voltage of the start capacitor described in FIG. 6 decreases below the threshold voltage VT, discharging operation of the discharging unit 60 is switched from off to on, as shown in E9. Then, intermittent power transmission for landing detection by the power transmission unit 12 is performed, as shown in E10.

In the present embodiment as described above, on the condition that the power receiving device 40 has started the load modulation, as shown in B5 in FIG. 4, normal power transmission by the power transmission unit 12 is started, as shown in B6. While the load modulation in B5 continues, the normal power transmission shown in B6 continues. Specifically, as shown in C5 in FIG. 5, in the case where load modulation is not detected any more, normal power transmission by the power transmission unit 12 is stopped as shown in C6. Then, intermittent power transmission for landing detection by the power transmission unit 12 begins to be performed, as shown in C9.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, complex authentication processing or the like can be made unnecessary, and contactless power transmission and communication by load modulation can be realized in a simple operation sequence. Also, as a result of performing communication by regular load modulation during a normal power transmission period, effective contactless power transmission according to the state of the power transmission or the like can be realized.

Also, in the present embodiment, as shown in D1 in FIG. 6, in the case where full charge of the battery 90 in the power receiving device 40 is detected based on communication data from the power receiving side, normal power transmission by the power transmission unit 12 is stopped as shown in D2, and intermittent power transmission for removal detection begins to be performed. Then, when the electronic apparatus 510 is removed and the removal is detected as shown in D9, intermittent power transmission for landing detection by the power transmission unit 12 is started, as shown in D12.

In this way, when full charge is detected, normal power transmission which is continuous power transmission is stopped, and intermittent power transmission in which power is intermittently transmitted is started. Accordingly, wasteful power consumption during a removal period or the like can be suppressed, and power saving or the like can be realized.

Also, in the present embodiment, in the case where an abnormality on the power receiving side is detected based on communication data, normal power transmission by the power transmission unit 12 is stopped, and intermittent power transmission for removal detection begins to be performed. The abnormality on the power receiving side is a battery charge error such as battery fail in which the voltage of the battery 90 decreases below 1.0 V, for example, a timer end error of a charging time exceeding a predetermined period (6 to 8 hours, for example), or the like. In this way, in the case where an abnormality on the power receiving side is detected, normal power transmission which is continuous power transmission is automatically stopped, and intermittent power transmission is started, and as a result safety, reliability, and the like can be secured.

Also, in the case where abnormal temperature occurs as an abnormality on the power receiving side as well, normal power transmission by the power transmission unit 12 is suspended, and intermittent power transmission for removal detection is performed. Note that, in the case of abnormal temperature, a special operation sequence as shown in FIG. 7 is executed. Specifically, as shown in E1 in FIG. 7, in the case where abnormal temperature (high temperature error) of the battery 90 in the power receiving device 40 is detected based on communication data (temperature error flag), normal power transmission is suspended, and intermittent power transmission by the power transmission unit 12 is performed during a waiting period TOW as shown in E2. Then, after the waiting period TOW has elapsed, normal power transmission by the power transmission unit 12 is resumed as shown in E4.

In this way, the waiting period TOW is set in the case of abnormal temperature, normal power transmission, which is continuous power transmission, is not performed during the waiting period TOW, and charging of the battery 90 is not performed as well. Accordingly, heat dissipation or the like of the battery 90 is possible using the waiting period TOW. Also, charging of the battery 90 through normal power transmission can be resumed after the waiting period TOW has elapsed. Accordingly, appropriate charging control or the like on the battery 90 under a high temperature environment or the like can be realized, for example.

4. Discharging Operation of Discharging Unit

In the present embodiment, as described in FIGS. 5 and 6, the control unit 54 on the power receiving side (discharging system control unit) starts the discharging operation of the discharging unit 60 after the rectification voltage VCC (VD5), which is the output voltage of the power receiving unit 52, has decreased and the start-up period TST of the discharging operation has elapsed. Then, power from the battery 90 is discharged to the power supply target 100. Specifically, the control unit 54 starts the discharging operation of the discharging unit 60 after the start-up period TST has elapsed from when the rectification voltage VCC (or later-described VD5) decreased below the judgement voltage (3.1 V). For example, the control unit 54 outputs a signal to start discharging to the discharging unit 60 so as to start discharging operation. Accordingly, as shown in C8 in FIG. 5 or D11 in FIG. 6, the discharging operation of the discharging unit 60 is turned on and power from the battery 90 is supplied to the power supply target 100.

Also, in the present embodiment, as shown in D2 and D7 in FIG. 6, the intermittent power transmission for removal detection is performed at intervals of the period TR1 (1.5 s, for example) that is shorter than the start-up period TST (3 s, for example). That is, the start-up period TST is longer than the period TR1 of an interval of the intermittent power transmission for removal detection.

In this way, the start-up period TST does not elapse during the period TR1 for removal detection, and therefore the discharging operation of the discharging unit 60 is not turned on during intermittent power transmission period for removal detection. When the electronic apparatus 510 is removed, as shown in D9 in FIG. 6, the rectified voltage VCC no longer regularly rises as in an intermittent power transmission period for removal detection, and the discharging operation of the discharging unit 60 is turned on, as shown in D11, as a result of the start-up period TST having elapsed as shown in D7. Accordingly, the discharging operation of the discharging unit 60 is automatically turned on as a result of detecting removal of the electronic apparatus 510, and power from the battery 90 can by supplied to the power supply target 100.

That is, when deterioration in cycle characteristics of the battery 90 is considered as described above, the discharging current of the battery 90 after full charge is ideally zero. In this regard, in the present embodiment, in addition to the discharging operation of the discharging unit 60 being turned off in the charge period (normal power transmission period) before full charge, as shown in FIG. 5, the discharging operation of the discharging unit 60 is also turned off in a period of the intermittent power transmission after full charge, as shown in FIG. 6. Accordingly, the discharging current of the battery 90 after being fully charged can be reduced to approximately zero, and a situation in which unnecessary recharging is performed can be suppressed. Therefore, deterioration in the cycle characteristics or the like of the battery 90 caused by recharging can be suppressed. Also, as a result of the discharging operation of the discharging unit 60 being turned off in a period of the intermittent power transmission after full charge, wasteful discharging of power from the battery 90 can be suppressed. Therefore, wasteful power consumption in a waiting period in which the intermittent power transmission is performed can be suppressed, and power saving can be realized.

Figure 8:
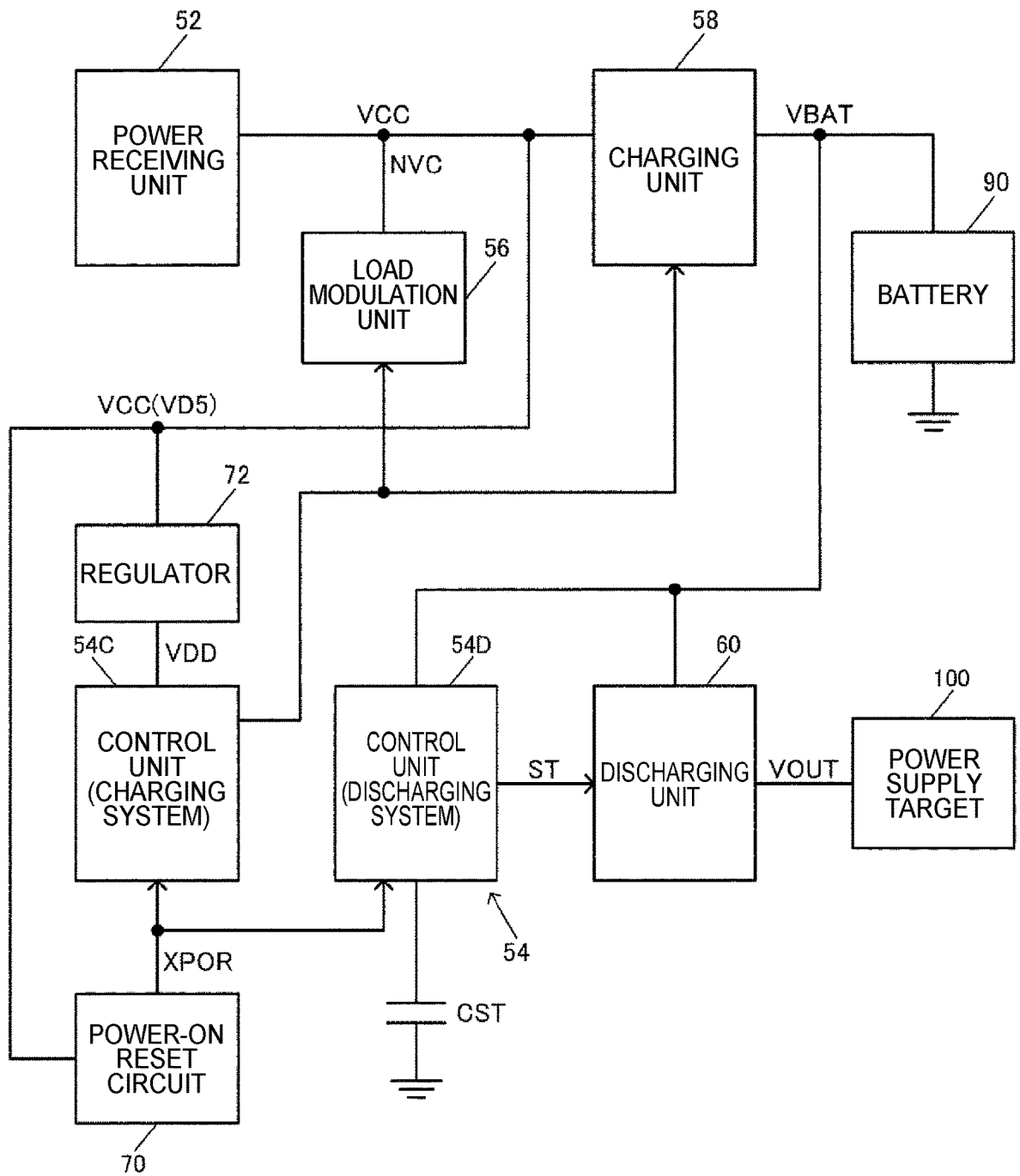
FIG. 8 is a detailed exemplary configuration of the control device on the power receiving side.

FIG. 8 is a diagram illustrating a detailed exemplary configuration of the power receiving side control device 50. As shown in FIG. 8, the control device 50 is provided with a charging system control unit 54C and a discharging system control unit 54D as the control unit 54. The charging system control unit 54C is supplied with the power supply voltage VDD based on the output voltage VCC (rectification voltage) of the power receiving unit 52 so as to operate. For example, the regulator 72 generates a power supply voltage of VDD=1.8 V, for example, by performing regulation (stepping down) of VCC, and supplies the generated voltage to the charging system control unit 54C.

Figure 9A:
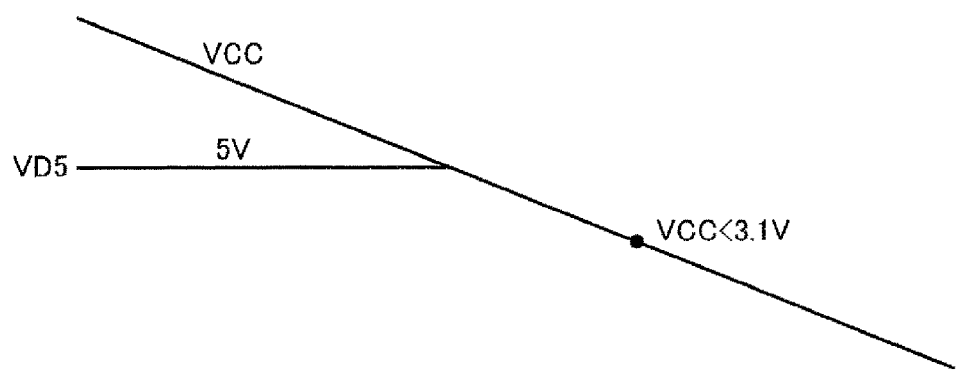
FIGS. 9A and 9B are diagrams for describing a configuration of a discharging system control unit.

Note that the power supply voltage VDD=1.8 V may be generated based on a later-described voltage VD5 (=5 V) in FIG. 19. That is, as shown in FIG. 9A, the voltage VD5 is a constant voltage that is to be generated by regulating the voltage VCC using the regulator 57 in FIG. 19. For example, as shown in FIG. 9A, in a low voltage range of VCC<5.0 V, the VD5 is equal to the VCC, and the VD5 and the VCC are equivalent voltages. Therefore, the VD5 can be used in place of the VCC.

On the other hand, the discharging system control unit 54D operates with the power supply voltage based on the battery voltage VBAT (VBAT itself or a power supply voltage generated based on the VBAT). The discharging unit 60 also operates with the power supply voltage based on the battery voltage VBAT.

That is, in a period in which the electronic apparatus 510 is placed on the charger 500, and the power receiving unit 52 receives power, as shown in A2 in FIG. 3, the control unit 54C of the charging system is supplied with the power supply voltage VDD that is based on the output voltage VCC of the power receiving unit 52 (VD5) so as to operate. The control unit 54C controls the load modulation unit 56, the charging unit 58, and the like.

On the other hand, when a state is achieved in which the electronic apparatus 510 is removed from the charger 500, as shown in A4 and A5 in FIG. 3, and the power receiving unit 52 does not receive power, the output voltage VCC of the power receiving unit 52 (VD5) decreases to 0 V, and the charging system circuits such as the control unit 54C enter a reset state.

Specifically, a power-on reset circuit 70 in FIG. 8 outputs a power-on reset signal XPOR based on the voltage VCC (VD5, in actuality). In a period in which the power receiving unit 52 is receiving power, and the VCC is a sufficiently high voltage, the power-on reset signal XPOR is at a high level (inactive), and the charging system circuits such as the control unit 54C enter an operable state. On the other hand, when the electronic apparatus 510 has been removed, the power receiving unit 52 no longer receives power, and VCC (VD5) decreases, the power-on reset signal XPOR is at a low level (active), and the charging system circuits such as the control unit 54C enter a reset state.

At this time, the battery voltage VBAT is supplied to the control unit 54D and the discharging unit 60, which are discharging system circuits. Therefore, even in a period in which the power-on reset signal XPOR is at a low level, and the charging system circuits are in a reset state, the control unit 54D and the discharging unit 60 are in an operable state due to the power supply voltage based on the battery voltage VBAT being supplied. Accordingly, as shown in FIGS. 5 and 6, after the electronic apparatus 510 is removed, the discharging operation of the discharging unit 60 is turned on, and thus an operation in which power of the battery 90 is supplied to the power supply target 100, or the like can be realized.

Also, in the present embodiment, the start capacitor CST (hereinafter simply referred to as a capacitor CST) for starting up the discharging operation is provided, as shown in FIG. 8. The capacitor CST is provided as a component external to the control device 50, for example.

The control unit 54D of the discharging system starts discharging of the capacitor CST that is charged when the power receiving unit 52 is receiving power, when the output voltage VCC (VD5) of the power receiving unit 52 decreases below the judgement voltage (3.1 V). That is, the capacitor CST is charged in the charge period of the battery 90 and the like. On the other hand, as shown in C4 in FIG. 5 and D9 in FIG. 6, when the electronic apparatus 510 is removed, and the voltage VCC (VD5) decreases below 3.1 V, which is the judgement voltage, discharging of the capacitor CST starts.

When the charge voltage of the capacitor CST has decreased below the threshold voltage VT, the discharging operation of the discharging unit 60 starts, as shown in C8 in FIG. 5 and D11 in FIG. 6. That is, the discharging operation of the discharging unit 60 is switched from off to on. By using such a capacitor CST, how much the start-up period TST (3 s) shown in FIGS. 5 and 6 has elapsed can be measured.

Figure 9B:
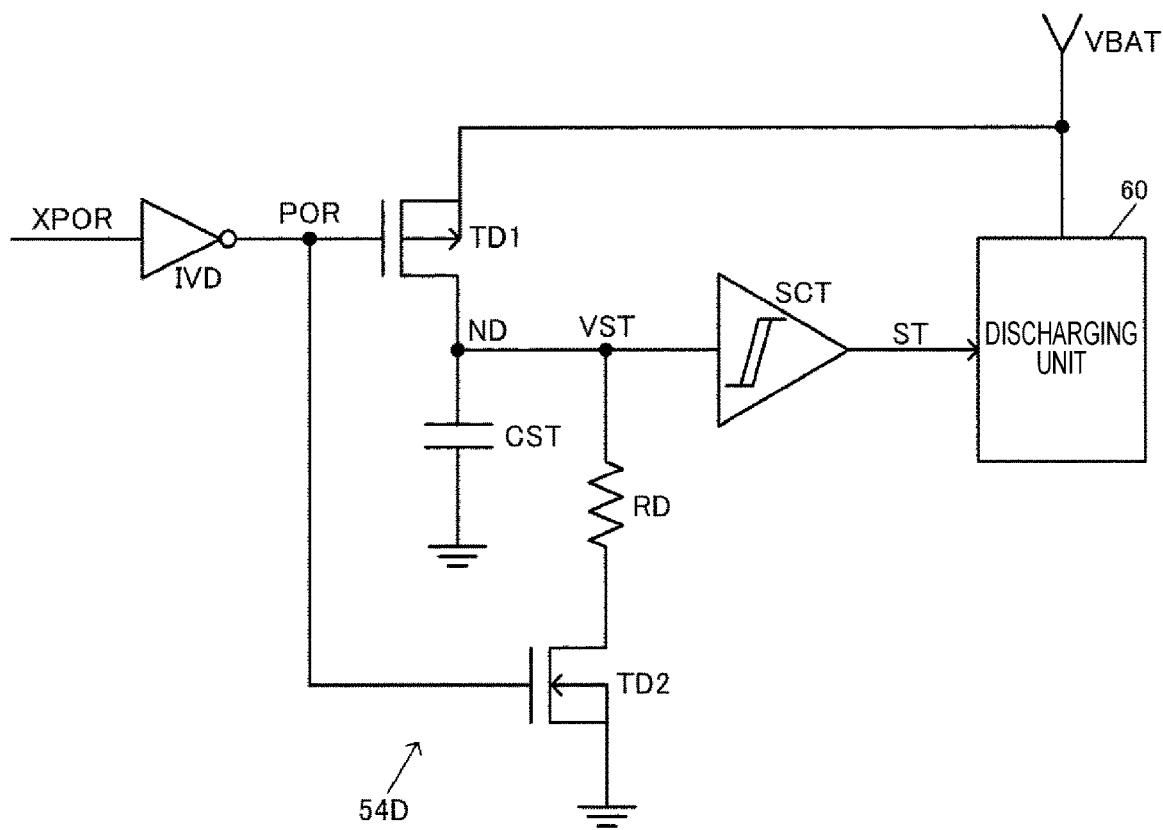

A specific exemplary configuration of the control unit 54D of the discharging system is shown in FIG. 9B. The control unit 54D includes a first transistor TD1 for charging a capacitor CST and a second transistor TD2 for discharging the capacitor CST. Also, a resistor RD and a schmitt trigger circuit SCT (voltage detection circuit, in a broad sense) can be included.

A control signal that is at a high level (first voltage level, in a broad sense) when the output voltage VCC (VD5) of the power receiving unit 52 is greater than or equal to a judgement voltage (VCC≥3.1 V), and at a low level (second voltage level, in a broad sense) when the VCC (VD5) is less than the judgement voltage (VCC<3.1 V) is input to the control unit 54D. In FIG. 9B, this control signal is a power-on reset signal XPOR.

In the case where the power-on reset signal XPOR, which is a control signal, is at a high level (first voltage level), the transistor TD2 is turned off and the transistor TD1 is turned on. That is, a signal POR, which is an inversion signal of XPOR, becomes a low level, and therefore the P-type transistor TD1 turns on. Accordingly, the capacitor CST is charged. For example, a charging current flows into a charging node ND from a node at the battery voltage VBAT via the turned-on transistor TD1, and the capacitor CST is charged.

On the other hand, in the case where the power-on reset signal XPOR, which is a control signal, is at a low level (second voltage level), the transistor TD1 is turned off and the transistor TD2 is turned on. That is, a signal POR, which is the inversion signal of XPOR, is at a high level, and therefore the N-type transistor TD2 turns on. Accordingly, the capacitor CST is discharged. For example, a discharging current flows from the charging node ND of the capacitor CST to a GND side via the resistor RD and the turned-on transistor TD2, and the capacitor CST is discharged.

Then, when a voltage VST at the charging node ND of the capacitor CST has decreased below the threshold voltage VT, the schmitt trigger circuit SCT (voltage detection circuit) activates a discharging start signal ST and outputs the signal to the discharging unit 60. Accordingly, the discharging operation of the discharging unit 60 is started.

FIG. 10 is a signal waveform diagram for describing the operation of the control unit 54D in FIG. 9B. As shown in FIG. 10, in a period in which a primary coil drive voltage is at a high level, and power is supplied from the power transmitting side, the power-on reset signal XPOR is at a high level, and charging system circuits such as the control unit 54C enter an operable state. Also, the transistor TD2 in FIG. 9B is turned off and the transistor TD1 is turned on, and as a result, the capacitor CST is charged.

In a period in which the primary coil drive voltage is at a low level and power is not supplied from the power transmitting side, the power-on reset signal XPOR is at a low level, and the charging system circuits such as the control unit 54C enter a reset state. Also, the transistor TD1 in FIG. 9B is turned off and the transistor TD2 is turned on, and as a result, the capacitor CST is discharged. Then, when the start-up period TST has elapsed, the discharging operation of the discharging unit 60 is started.

In the present embodiment as described above, start control of the discharging operation or the like is realized by effectively using the signal XPOR that is used for power-on resetting of the charging system circuits. That is, attention is paid to the fact that the discharging system circuits operate in a period in which the charging system circuits enter a reset state, and the power-on reset signal XPOR used for resetting the charging system circuits is effectively used.

Figure 11:
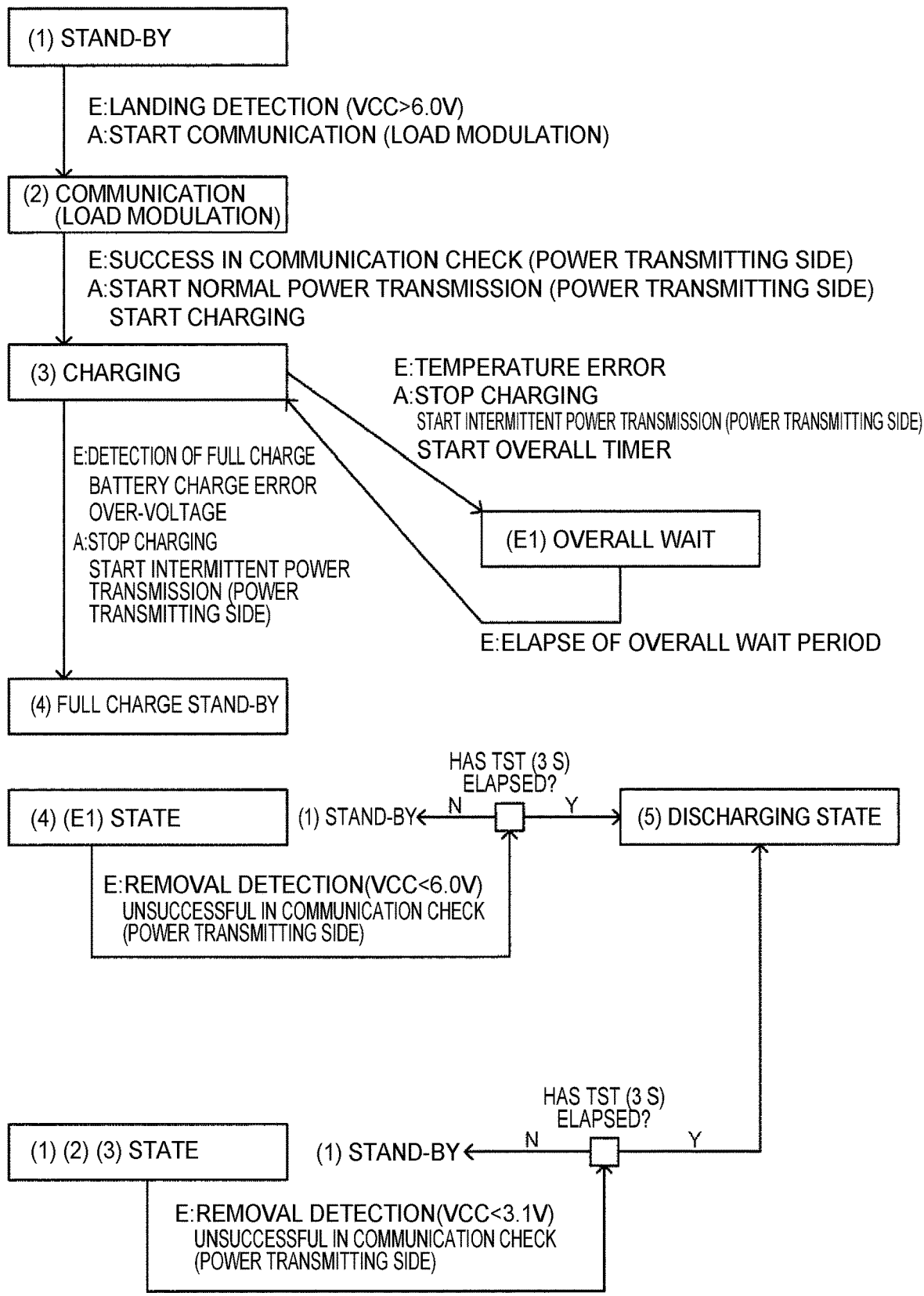
FIG. 11 is a sequence diagram for describing operations of the present embodiment.

FIG. 11 is a sequence diagram for describing operations of the present embodiment. In FIG. 11, "E" indicates an event, and "A" indicates an action that is performed when an event occurs.

When landing is detected (VCC>6.0 V) in a stand-by state (1), communication is started. That is, the load modulation unit 56 on the power receiving side starts load modulation. Accordingly, the state transitions to a communication (load modulation) state (2).

In the communication state (2), the power transmitting side starts normal power transmission when communication check is successful. That is, the power transmitting side starts normal power transmission as shown in B6 when detecting load modulation shown in B5 in FIG. 4. Also, the power receiving side starts charging the battery 90 based on the received power. With this, the state transitions to a charging state (3).

In the charging state (3), the power receiving side stops charging of the battery 90 when full charge is detected, or a battery charge error or an over-voltage (over-voltage of the charge voltage) is detected. The power transmitting side starts intermittent power transmission (for removal detection). With this, the state transitions to a full charge stand-by state (4).

Also, as described in FIG. 7, when a temperature error is detected in the charging state (3), the power receiving side stops charging of the battery 90, and the power transmitting side starts intermittent power transmission. Then, an overall timer starts measuring time, and the state transitions to an overall waiting state (E1). When an overall waiting period has elapsed, the state returns to the charging state (3).

In the full charge stand-by state (4) or the overall waiting state (E1), intermittent power transmission for removal detection is performed. In a period (TR2) of removal detection with the intermittent power transmission, when VCC is more than 6.0 V and the communication check on the power transmitting side is successful (load modulation is detected), it is judged that removal has not been performed, and the state (4) or (E1) continues. On the other hand, in the state (4) or (E1), when VCC is less than 6.0 V and the communication check on the power transmitting side is unsuccessful (load modulation is not detected), it is judged that the electronic apparatus 510 has been removed, and the state transitions to the stand-by state (1). Here, when the start-up period TST has elapsed after VCC decreased below 3.1 V, the state transitions to the discharging state (5), and the discharging operation of the discharging unit 60 is started.

In this case, as described in FIG. 6, the start-up period TST (3 s) is longer than the interval (1.5 s) of the intermittent power transmission for removal detection. Therefore, unless the electronic apparatus 510 has been actually removed, and the start-up period TST has elapsed, the intermittent power transmission for removal detection continues.

Also, in the states (1), (2), and (3) as well, when VCC is less than 3.1 V and the communication check on the power transmitting side is unsuccessful, it is judged that the electronic apparatus 510 has been removed, and the state transitions to the stand-by state (1). Here, when the start-up period TST has elapsed after VCC has decreased below 3.1 V, the state transitions to the discharging state (5), and the discharging operation of the discharging unit 60 is started.

In the present embodiment, as shown in the stand-by state (1) in FIG. 11, the load modulation unit 56 starts load modulation when landing is detected, and communication is performed. On the other hand, as shown in the full charge stand-by state (4) or the like, the load modulation unit 56 stops load modulation when removal is detected. In this case, landing detection and removal detection are performed based on the output voltage (VCC) of the power receiving unit 52.

Also, in the present embodiment, the load modulation unit 56 transmits communication data including information for causing the power transmitting device 10 to perform intermittent power transmission for removal detection by this load modulation. For example, as shown in the charging state (3), the load modulation unit 56 transmits communication data including detection information regarding full charge of the battery 90 or abnormality detection information regarding the power receiving side (such as a battery charge error and an over-voltage) as the information for causing the power transmitting device 10 to perform intermittent power transmission for removal detection. With this, the power transmitting device 10 performs intermittent power transmission for removal detection.

5. Communication Method

Figure 12:
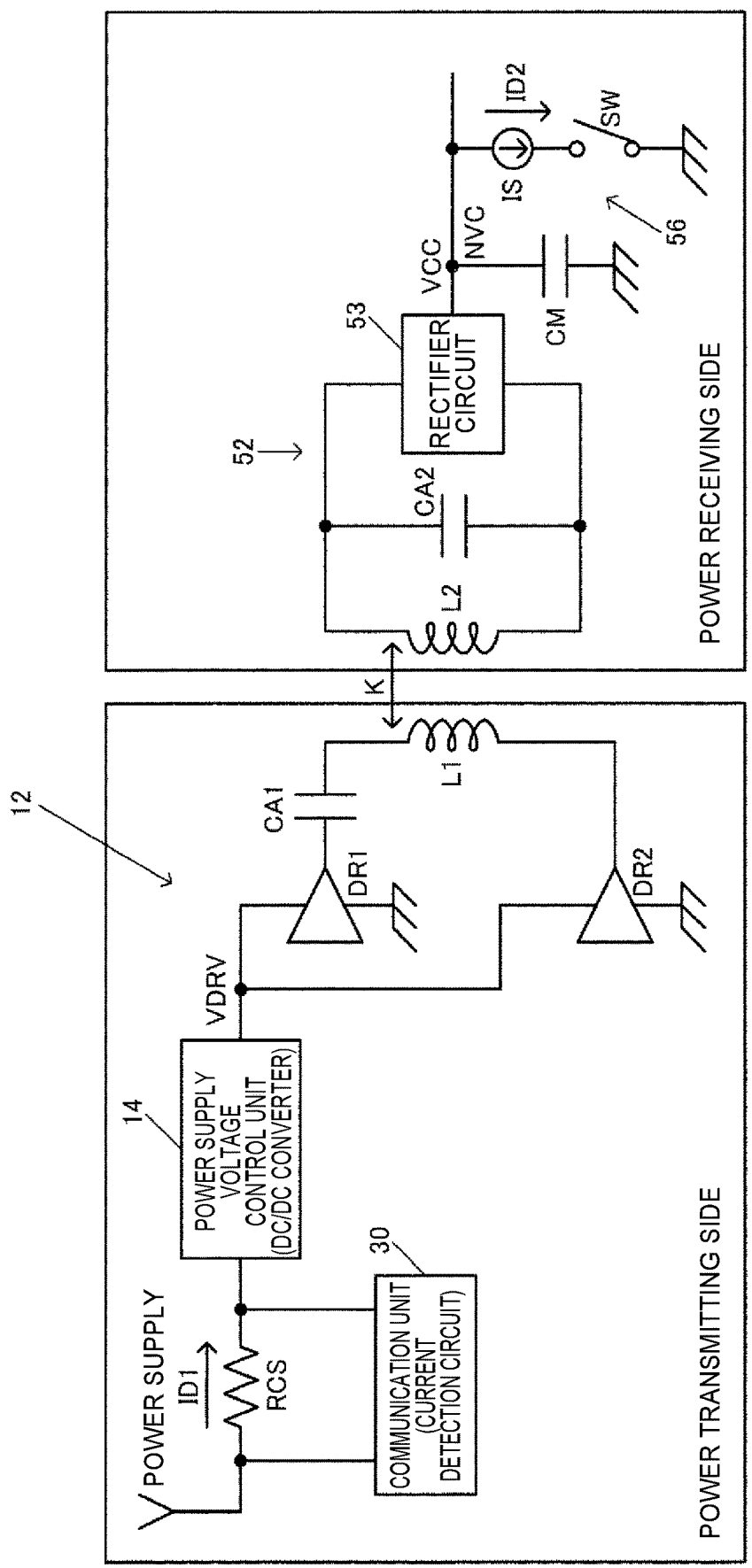
FIG. 12 is a diagram for describing a communication method using load modulation.

FIG. 12 is a diagram for describing an example of the method of communication by load modulation. The power transmission drivers DR1 and DR2 in the power transmission unit 12 drive the primary coil L1 on the power transmitting side (primary side), as shown in FIG. 12. Specifically, the power transmission drivers DR1 and DR2 operate based on the power supply voltage VDRV supplied from the power supply voltage control unit 14 and drive the primary coil L1.

On the other hand, on the power receiving side (secondary side), the coil end voltage of the secondary coil L2 is rectified by the rectifier circuit 53 in the power receiving unit 52, and a rectified voltage VCC is output to the node NVC. Note that the primary coil L1 and a capacitor CA1 constitute a resonance circuit on the power transmitting side, and the secondary coil L2 and the capacitor CA2 constitute a resonance circuit on the power receiving side.

On the power receiving side, a current ID2 of the current source IS is caused to intermittently flow from the node NVC to the GND side by turning on and off the switching element SW in the load modulation unit 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 1A, for example) on the power transmitting side and the power supply voltage control unit 14. A power supply voltage is supplied from the power supply to the power supply voltage control unit 14 via the sense resistor RCS. A current ID1 that flows from the power supply to the sense resistor RCS changes due to the change of the load state on the power receiving side caused by load modulation, and the communication unit 30 detects the change in the current. Then, the communication unit 30 performs a detection operation for detecting communication data that is transmitted by load modulation based on the detection result.

Figure 13:
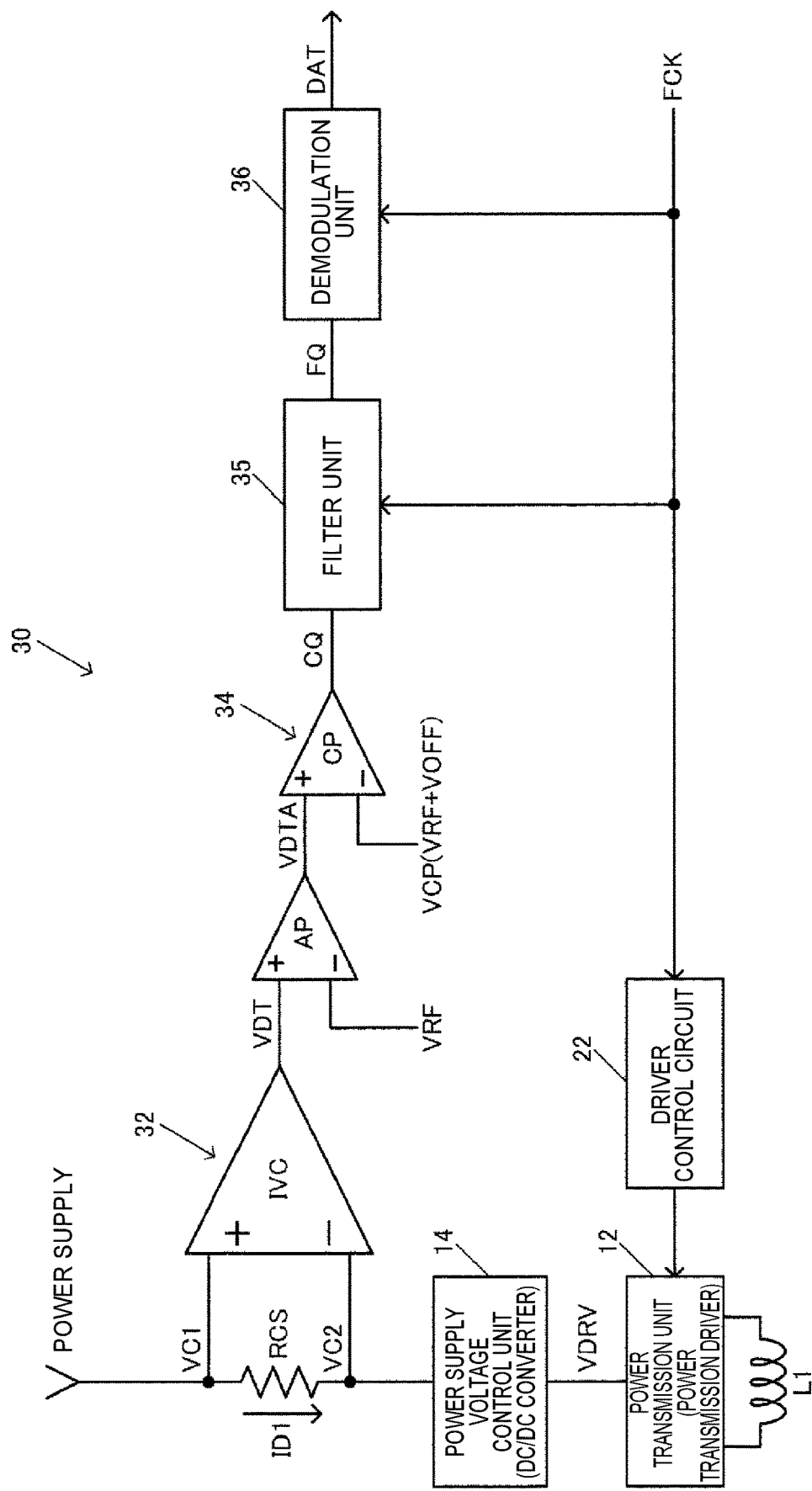
FIG. 13 shows an exemplary configuration of a communication unit.

An example of the specific configuration of the communication unit 30 is shown in FIG. 13. The communication unit 30 includes a current detection circuit 32, a comparator circuit 34, and a demodulation unit 36, as shown in FIG. 13. Also, the communication unit 30 can include an amplifier AP for signal amplification and a filter unit 35. Note that the communication unit 30 is not limited to the configuration in FIG. 13, and various modifications can be implemented such as omitting a portion of the constituent elements, adding another constituent element (bandpass filter unit, for example), or changing connection relationships.

The current detection circuit 32 detects the current ID1 that flows from the power supply (power supply device) to the power transmission unit 12. Specifically, the current detection circuit 32 detects the current ID1 that flows from the power supply to the power transmission unit 12 via the power supply voltage control unit 14. The current ID1 may include a current that flows in the driver control circuit 22 and the like, for example.

In FIG. 13, the current detection circuit 32 is constituted by an IV conversion amplifier IVC. A non-inverting input terminal (+) of the IV conversion amplifier IVC is connected to one end of the sense resistor RCS, and an inverting input terminal (−) thereof is connected to the other end of the sense resistor RCS. The IV conversion amplifier IVC amplifies a minute voltage VC1-VC2 that is generated by the minute current ID1 that flows in the sense resistor RCS, and outputs the amplified voltage as the detection voltage VDT. The detection voltage VDT is further amplified by the amplifier AP, and the amplified voltage is output to the comparator circuit 34 as a detection voltage VDTA. Specifically, the detection voltage VDT is input to a non-inverting input terminal of the amplifier AP, and a reference voltage VRF is input to an inverting input terminal thereof, and the amplifier AP outputs the detection voltage VDTA signal that has been amplified with reference to the reference voltage VRF.

The comparator circuit 34 compares the detection voltage VDTA by the current detection circuit 32 with a judgement voltage VCP=VRF+VOFF. Then, the comparator circuit 34 outputs a comparison result CQ. For example, the comparator circuit 34 performs comparison to judge whether the detection voltage VDTA exceeds the judgement voltage VCP or is lower than the judgement voltage VCP. The comparator circuit 34 can be constituted by a comparator CP, for example. In this case, the voltage VOFF of the judgement voltage VCP=VRF+VOFF may be realized by an offset voltage of the comparator CP, or the like.

The demodulation unit 36 determines a load modulation pattern based on the comparison result CQ (comparison result FQ after filtering processing) of the comparator circuit 34. That is, communication data is detected by performing demodulation processing with the load modulation pattern, and is output as detection data DAT. The control unit 24 on the power transmitting side performs various types of processing based on the detection data DAT.

Note that, in FIG. 13, the filter unit 35 is provided between the comparator circuit 34 and the demodulation unit 36. The demodulation unit 36 determines the load modulation pattern based on the comparison result FQ after filtering processing by the filter unit 35. Although a digital filter or the like can be used as the filter unit 35, for example, a passive filter may be used as the filter unit 35. By providing the filter unit 35, adverse effects from noise in later-described F1 and F2 in FIG. 15, for example, can be reduced.

The filter unit 35 and the demodulation unit 36 operate with receiving a drive clock signal FCK, for example. The drive clock signal FCK is a signal for defining a power transmission frequency, and the driver control circuit 22 drives the power transmission drivers DR1 and DR2 in the power transmission unit 12 with receiving the drive clock signal FCK. The primary coil L1 is driven at a frequency (power transmission frequency) defined by the drive clock signal FCK.

Note that a bandpass filter unit that performs bandpass filtering processing in which a signal in a load modulation frequency band is allowed to pass, and signals in bands other than the load modulation frequency band are attenuated may be provided in the communication unit 30. In this case, the communication unit 30 detects communication data from the power receiving device 40 based on the output of the bandpass filter unit. Specifically, the bandpass filter unit performs bandpass filtering processing on the detection voltage VDT of the current detection circuit 32. The comparator circuit 34 compares the detection voltage VDTA after bandpass filtering processing by the bandpass filter unit and the judgement voltage VCP. The bandpass filter unit may be provided between the IV conversion amplifier IVC and the amplifier AP.

Figure 14:
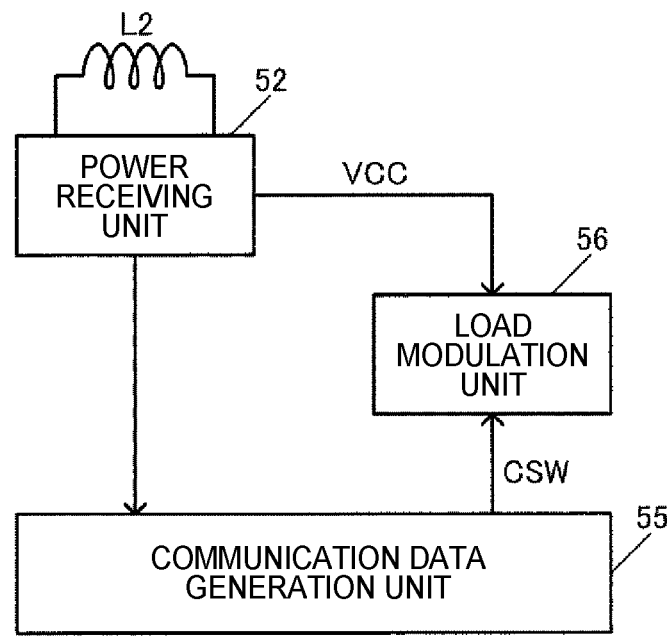
FIG. 14 is a diagram for describing a communication configuration on a power receiving side.

FIG. 14 is a diagram for describing a communication configuration on the power receiving side, for example. The power receiving unit 52 extracts a clock signal having a frequency corresponding to the drive clock signal FCK, and supplies the extracted signal to the communication data generation unit 55. The communication data generation unit 55 is provided in the control unit 54 in FIG. 2, and performs processing for generating communication data based on the supplied clock signal. The communication data generation unit 55 outputs a control signal CSW for transmitting the generated communication data to the load modulation unit 56, and causes the load modulation unit 56 to perform load modulation corresponding to the communication data by performing turning on and off the switching element SW, for example, with the control signal CSW.

The load modulation unit 56 performs load modulation by changing the load state (load due to load modulation) on the power receiving side to states such as a first load state and a second load state, for example. The first load state is a state in which the switching element SW is turned on, for example, and is a state in which the load state (load in load modulation) on the power receiving side is a high load (low impedance). The second load state is a state in which the switching element SW is turned off, for example, and is a state in which the load state (load in load modulation) on the power receiving side is a low load (high impedance).

In the load modulation method so far, communication data is transmitted from the power receiving side to the power transmitting side by associating the first load state with a logic level "1" (first logic level) of the communication data and associating the second load state with a logic level "0" (second logic level) of the communication data. That is, communication data having a predetermined number of bits has been transmitted by turning on the switching element SW if the logic level of a bit in the communication data is "1", and by turning off the switching element SW if the logic level of the bit in the communication data is "0".

However, in an application in which the coupling degree between the coils is small, the coils are small, or transmitting power is also small, for example, realization of adequate communication is difficult with such a known load modulation method. That is, even if the load state of the power receiving side is changed by load modulation to the states such as the first load state and the second load state, data detection error in logic levels "1" and "0" in the communication data occurs due to noise. That is, even if load modulation is performed on the power receiving side, the current ID1 that flows in the sense resistor RCS on the power transmitting side due to this load modulation becomes a very minute current. Therefore, if noise is superimposed, a data detection error occurs, and a communication error due to noise or the like occurs.

Figure 15:
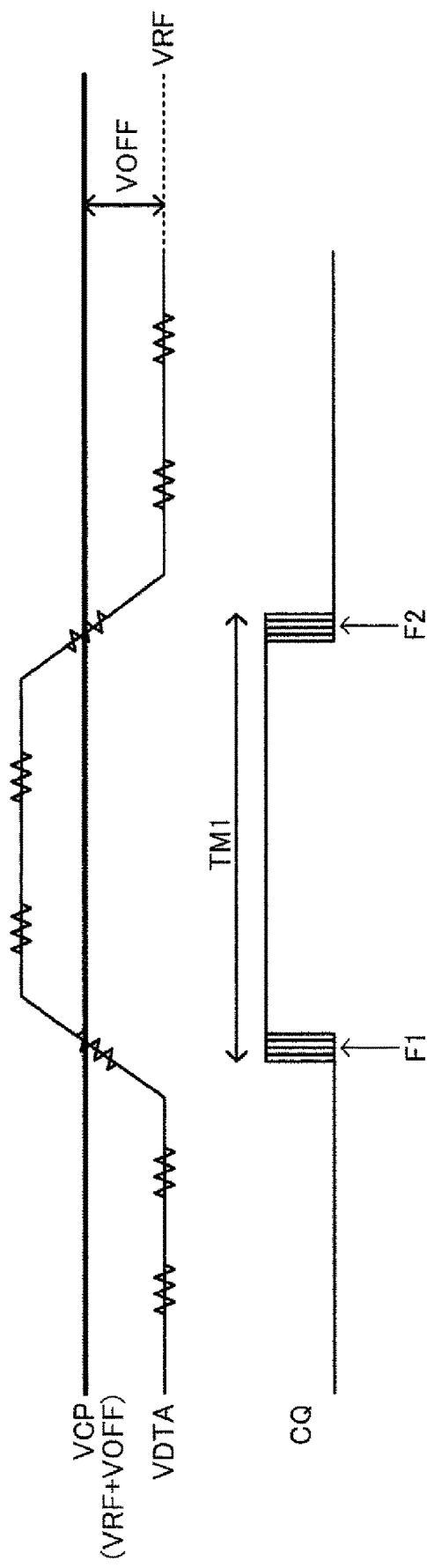
FIG. 15 is a diagram for describing a problem caused by noise when communication is performed.

For example, FIG. 15 is a diagram schematically illustrating signal waveforms of the detection voltage VDTA, the judgement voltage VCP and the comparison judgement result CQ of the comparator circuit 30. As shown in FIG. 15, the detection voltage VDTA is a voltage signal that changes relative to the reference voltage VRF, and the judgement voltage VCP is a voltage signal in which the offset voltage VOFF of the comparator CP is added to the reference voltage VRF.

As shown in FIG. 15, when noise is superimposed on the detection voltage VDTA signal, for example, edge positions of the comparison result CQ signal change as illustrated in F1 and F2, and the width (interval) of a period TM1 changes so as to increase or decrease. For example, assuming that the period TM1 is a period corresponding to the logic level "1", if the width of the period TM1 changes, a sampling error of the communication data occurs, and a communication data detection error occurs. Specifically, in the case where communication is performed by regular load modulation in a normal power transmission period, an amount of noise that is superimposed on the communication data may be increased, and the probability of occurrence of the communication data detection error increases.

In the present embodiment, a method is adopted in which the logic level "1" (data 1) or the logic level "0" (data 0) of each bit in the communication data is transmitted from the power receiving side using a load modulation pattern, and is detected on the power transmitting side.

Specifically, as shown in FIG. 16, the load modulation unit 56 on the power receiving side performs load modulation such that the load modulation pattern is a first pattern PT1 for a first logic level "1" of the communication data that is transmitted to the power transmitting device 10. On the other hand, the load modulation unit 56 on the power receiving side performs load modulation such that the load modulation pattern is a second pattern PT2 that is different from the first pattern PT1 for a second logic level "0" of the communication data.

The communication unit 30 (demodulation unit) on the power transmitting side determines that the communication data is communication data of the first logic level "1" if the load modulation pattern is the first pattern PT1. On the other hand, the communication unit 30 determines that the communication data is communication data of the second logic level "0" if the load modulation pattern is the second pattern PT2 that is different from the first pattern PT1.

Here, the load modulation pattern is a pattern constituted by the first load state and the second load state. The first load state is a state in which the load on the power receiving side set by the load modulation unit 56 is a high load, for example. Specifically, in FIG. 16, a period TM1 in the first load state is a period in which the switching element SW in the load modulation unit 56 is turned on and current of the current source IS flows from the node NVC to the GND side, and is a period corresponding to a high level (bit=1) in the first and second patterns PT1 and PT2.

On the other hand, the second load state is a state where the load on the power receiving side set by the load modulation unit 56 is a low load, for example. Specifically, in FIG. 16, a period TM2 in the second load state is a period in which the switching element SW in the load modulation unit 56 is turned off, and is a period corresponding to a low level (bit=0) in the first and second patterns PT1 and PT2.

In FIG. 16, the first pattern PT1 is a pattern in which the width of period TM1 in the first load state is longer than that in the second pattern PT2. The first pattern PT1 in which the width of period TM1 in the first load state is longer than that in the second pattern PT2 is determined to be the logic level "1". On the other hand, the second pattern PT2 in which the width of period TM1 in the first load state is shorter than that in the first pattern PT1 is determined to be the logic level "0".

As shown in FIG. 16, the first pattern PT1 is a pattern corresponding to a bit pattern (1110), for example. The second pattern PT2 is a pattern corresponding to a bit pattern (1010), for example. In these bit patterns, bit=1 corresponds to a state in which the switching element SW in the load modulation unit 56 is turned on, and bit=0 corresponds to a state in which the switching element SW in the load modulation unit 56 is turned off.

For example, in the case where the bit in transmitting communication data is a logic level "1", the switching element SW in the load modulation unit 56 is turned on and off, on the power receiving side, with a bit pattern (1110) that corresponds to the first pattern PT1. Specifically, switching control in which the switching element SW is sequentially turned on, on, on, and off is performed. Then, in the case where the load modulation pattern is the first pattern PT1 that corresponds to the bit pattern (1110), the logic level of the bit in the communication data is determined, on the power transmitting side, to be "1".

On the other hand, in the case where the bit in transmitting communication data is a logic level "0", the switching element SW in the load modulation unit 56 is turned on and off, on the power receiving side, with a bit pattern (1010) that corresponds to the second pattern PT2. Specifically, switching control in which the switching element SW is sequentially turns on, off, on, and off is performed. Then, in the case where the load modulation pattern is the second pattern PT2 that corresponds to the bit pattern (1010), the logic level of the bit in the communication data is determined, on the power transmitting side, to be "0".

Here, in the case where the drive frequency in the power transmission unit 12 is FCK, and the drive cycle is T=1/FCK, the length of each of the first and second patterns PT1 and PT2 is expressed as 512×T, for example. In this case, the length of one bit section can be expressed as (512×T)/4=128×T. Accordingly, in the case where the bit in the communication data is in a logic level "1", the switching element SW in the load modulation unit 56 is turned on and off, on the power receiving side, in the bit pattern (1110) that corresponds to the first pattern PT1 in an interval 128×T, for example. Also, in the case where the bit in the communication data is in a logic level "0", the switching element SW in the load modulation unit 56 is turned on and off, on the power receiving side, in the bit pattern (1010) that corresponds to the second pattern PT2 in the interval 128×T, for example.

Figure 17:
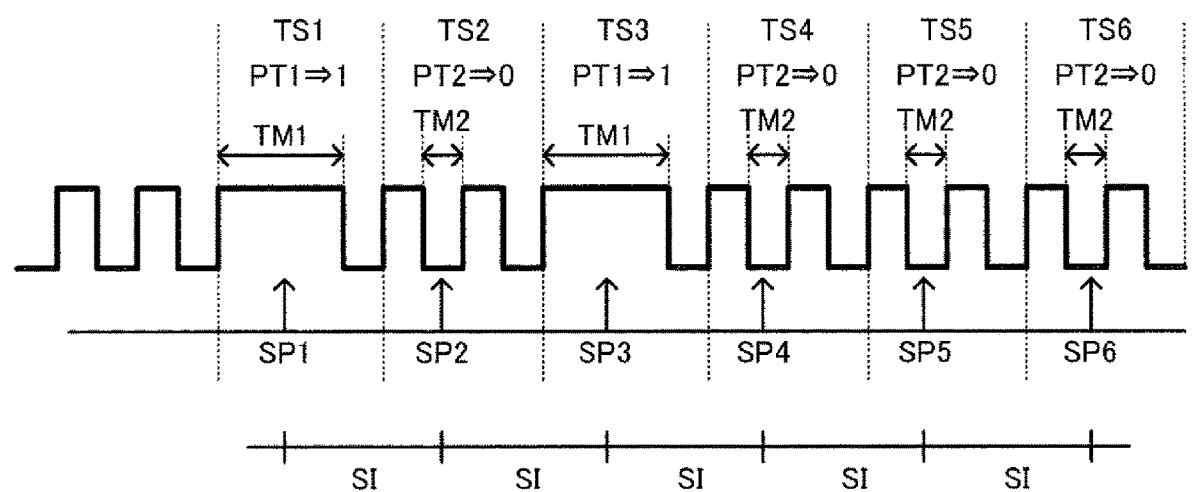
FIG. 17 is a diagram for describing the communication method of the present embodiment.

On the other hand, a detection operation and fetching processing for communication data are performed on the power transmitting side by a method shown in FIG. 17, for example. For example, the communication unit 30 (demodulation unit) performs sampling on the load modulation pattern from a first sampling point SP1 that is set in the period TM1 in the first load state in the first pattern PT1 at given sampling intervals SI and takes in communication data of a given number of bits.

For example, sampling points SP1, SP2, SP3, SP4, SP5, and SP6 in FIG. 17 are sampling points that are set at sampling intervals SI. The sampling interval SI is an interval that corresponds to the length of the load modulation pattern. That is, the sampling interval SI is an interval that corresponds to the length of each of the first and second patterns PT1 and PT2 that are load modulation patterns. For example, in FIG. 16, the length of each of the first and second patterns PT1 and PT2 is 512×T (=512/FCK), and therefore the length of the sampling interval SI is also 512×T.

In FIG. 17, the load modulation patterns in the periods TS1, TS2, TS3, TS4, TS5, and TS6 are respectively PT1, PT2, PT1, PT2, PT1, and PT2. Here, the periods TS1, TS2, TS3, TS4, TS5, and TS6 are periods that respectively correspond to the sampling points SP1, SP2, SP3, SP4, SP5, and SP6. Accordingly, in the case shown in FIG. 17, communication data (101000) having a number of bits=6, for example, is taken in by performing sampling on the load modulation pattern from the first sampling point SP1 at the sampling intervals SI.

Specifically, the communication unit 30 detects a pulse whose signal level is a high level, and performs bit synchronization in the case where the pulse width is less than a first range width (220×T to 511×T, for example). Then, in the case where the bit synchronization is achieved, the first sampling point SP1 is set at the center point of the pulse width, and signals are taken in at the sampling intervals SI (512×T, for example) from the first sampling point SP1. The logic level is determined to be a logic level "1" (first pattern PT1) if the level of the signal that is taken in is a high level, and the logic level is determined to be a logic level "0" (second pattern PT2) if the level of the signal that is taken in is a low level. In this way, in FIG. 17, communication data (101000) is taken in. In actuality, by taking in data in an amount of 15 bits after the bit synchronization (after data of 1 bit is taken in SP1), overall communication data of an amount of 16 bits is taken in. In this 16 bit communication data, the first 1 bit (the bit with which bit synchronization is achieved) is always "1".

In the present embodiment, as described above, in the case where the width of the period TM1 in the first load state is less than the first range width (220×T to 511×T), the first sampling point SP1 is set within the period TM1 of the first load state, as shown in FIG. 17. That is, in the case where the width of the period TM1 in which the signal level is at a high level is less than the first range width, bit synchronization is performed, and the first sampling point SP1 is set at the center point, for example, of the period TM1. Then, sampling is performed at the sampling intervals SI from the set first sampling point SP1. Here, the first range width (220×T to 511×T) is a range width that is set corresponding to the period TM1 (384×T) in the first load state in the first pattern PT1.

That is, as described in FIG. 15, the width of the period TM1 changes due to noise or the like. A typical value of the width of the period TM1 in the first pattern PT1 is a width 128×3×T=384×T that corresponds to an amount of 3 bits (111). Accordingly, the first range width (220×T to 511×T) is set so as to include this 384×T. The period at a high level that is less than the first range width (220×T to 511×T) is determined to be the period TM1 in the first pattern PT1, and bit synchronization for setting the first sampling point SP1 is performed. In this way, even in the case where noise is superimposed on the signal, as shown in FIG. 15, an adequate first sampling point SP1 can be set by performing adequate bit synchronization.

After setting the first sampling point SP1, sampling is performed at the sampling intervals SI, and either the first or second patterns PT1 and PT2 is determined based on the signal level at each sampling point. That is, the communication unit 30 determines that the load modulation pattern at the second sampling point SP2 is the first pattern PT1 in the case where the load state is the first load state (in the case where the signal level is at a high level) at the second sampling point SP2 which is next to the first sampling point SP1. That is, the communication unit 30 determines that the logic level of the bit in the communication data is "1".

On the other hand, the communication unit 30 determines that the load modulation pattern at the second sampling point SP2 is the second pattern PT2 in the case where the load state is the second load state (in the case where the signal level is in the low level) at the second sampling point SP2. That is, the communication unit 30 determines that the logic level of the bit in the communication data is "0". The same is applied to the sampling points thereafter.

For example, in FIG. 17, the load state at the sampling point SP2 is the second load state (low level), and therefore the load modulation pattern is determined to be the second pattern PT2, and the logic level is determined to be "0". Since the load state at the sampling point SP3 is the first load state (high level), the load modulation pattern is determined to be the first pattern PT1, and the logic level is determined to be "1". Since the load states at the sampling points SP4, SP5, and SP6 are the second load state (low level), the load modulation patterns are determined to be the second pattern PT2, and the logic levels are determined to be "0".

Note that, at each of the sampling points SP2 to SP6 in FIG. 17, the width of the load state period that includes the sampling point may be verified to be in a predetermined range width.

For example, in the case where, at the third sampling point SP2, the load state is the first load state (high level) and the width of the first load state period TM1 (high level pulse width) that includes the second sampling point SP2 is less than the first range width (220×T to 511×T), the load modulation pattern at the second sampling point SP2 is determined to be the first pattern PT1 (logic level "1").

On the other hand, in the case where, at the second sampling point SP2, the load state is the second load state (low level) and the width of the second load state period TM2 that includes the second sampling point SP2 is less than the second range width (80×T to 150×T, for example), the load modulation pattern at the second sampling point SP2 is determined to be the second pattern PT2 (logic level "0").

Here, the second range width (80×T to 150×T) is a range width that is set corresponding to the second load state period TM2 (128×T) in the second pattern PT2. Since the typical value of period TM2 is 128×T corresponding to 1 bit, the second range width (80×T to 150×T) is set so as to include the period 128×T.

In the present embodiment as described above, the logic level of the communication data is judged by determining the load modulation pattern. For example, in a known technique, a method is adopted in which the first load state in which the switching element SW in the load modulation unit 56 is turned on is judged to be the logic level "1", and the second load state in which the switching element SW is turned off is the logic level "0". However, in this known method, a communication data detection error due to noise or the like may occur, as described in FIG. 15.

In contrast, in the present embodiment, the logic level of each bit in the communication data is detected by determining whether the load modulation pattern is the first or second pattern PT1 or PT2, as shown in FIG. 16, for example. Accordingly, even in a situation in which there is a large amount of noise, as shown in FIG. 15, proper detection of the communication data is made possible. That is, the width of the first load state (high level) period TM1 is very different in the first and second patterns PT1 and PT2 in FIG. 16, and the logic level of each bit of the communication data is detected by identifying patterns as a result of identifying the difference of the period TM1 width in the present embodiment. For example, in the first bit synchronization in FIG. 17, in the case where the period TM1 width is less than the first range width (220×T to 511×T), the sampling point SP1 is set at the center point of the period TM1, and signals are taken in at the sampling points SP2, SP3, SP4, . . . , thereafter. Therefore, even in a case where the period TM1 width or the like at the sampling point SP1 changes due to noise, for example, proper detection of the communication data is made possible. Also, since the sampling points SP2, SP3, SP4, thereafter can be set by simple processing based on the sampling interval SI, there is an advantage in that the processing load in the detection operation of the communication data can be reduced.

Note that the communication method of the present embodiment is not limited to the method described in FIGS. 16, 17, and the like, and various modifications can be implemented. For example, although the first pattern PT1 is associated with the logic level "1" and the second pattern PT2 is associated with the logic level "0" in FIG. 16, the association relationship may be reversed. Also, the first and second patterns PT1 and PT2 in FIG. 16 are examples of the load modulation patterns, and the load modulation patterns of the present embodiment are not limited thereto and various modifications can be implemented. For example, although the first and second patterns PT1 and PT2 are set to have the same length in FIG. 16, they may be set to have different lengths. Also, in FIG. 16, although the first pattern PT1 of bit pattern (1110) and the second pattern PT2 of bit pattern (1010) are used, the first and second patterns PT1 and PT2 having different bit patterns may be adopted. For example, it is sufficient that the first and second patterns PT1 and PT2 are patterns in which at least the first load state period TM1 (or second load state period TM2) is different, and various patterns that are different from those shown in FIG. 16 can be adopted.

An example of the communication data format used in the present embodiment is shown in FIGS. 18A and 18B.

In FIG. 18A, the communication data is constituted by 64 bits, and one packet is configured by these 64 bits. The data of the first set of 16 bits is 00h. In the case where normal power transmission (or intermittent power transmission) is started on the power transmitting side by detecting the load modulation on the power receiving side, for example, a certain amount of time is required before the current detection circuit 32 or the like in the communication unit 30 operates and the communication data can be properly detected. Therefore, 00h that is dummy (null) data is set to the first 16 bits. Various processing necessary for bit synchronization, for example, is performed on the power transmitting side in a communication period of the first 16 bits 00h.

A data code and information on the rectified voltage (VCC) are set in the second set of 16 bits. The data code is a code for specifying data that is to be transmitted by the third set of 16 bits, as shown in FIG. 18B. The rectified voltage (VCC) is used as transmitting power setting information of the power transmitting device 10. Specifically, the power supply voltage control unit 14 variably controls the power supply voltage VDRV that is supplied to the power transmission drivers DR1 and DR2 based on the rectified voltage (VCC) information or the like, and thereby variably controls the transmitting power of the power transmission unit 12.

Information such as temperature, a charge voltage, a charge current, a status flag, number of cycles, or an IC number is set to the third set of 16 bits according to the setting designated by the data code. The temperature is a battery temperature or the like, for example. The charge voltage and the charge current are the charge voltage (such as VBAT) and the charge current of the battery 90, and are information representing the charge state. The status flag is information representing a status on the power receiving side such as a temperature error (high temperature abnormality, low temperature abnormality), a battery error (battery voltage less than or equal to 1.0 V), an over-voltage error, a timer error, or full charge (normal end), for example. The number of cycles (cycle times) is information representing the number of charging times. The IC number is a number for specifying a control device IC. CRC information is set in the fourth set of 16 bits. The CRC is information for CRC error check.

Note that, in the case where, in FIG. 4, landing of the electronic apparatus 510 is detected and VCC becomes larger than 6.0 V, communication data of null data (dummy data) in 1 packet (64 bits), for example, is transmitted first in the load modulation in B5. The normal power transmission is started on the power transmitting side by detecting the communication data of null data.

Also, although an example of the communication method of the present embodiment is shown in the above, the communication method of the present embodiment is not limited thereto, and various modifications can be implemented. For example, the communication method of the present embodiment is not limited to the method in which the load modulation patterns are associated with the logic levels shown in FIGS. 16 and 17, and a method in which the first load state is associated with the logic level "1" and the second load state is associated with the logic level "0", for example, or the like may be adopted. Also, the format of the communication data and the communication processing are not limited to the method described in the present embodiment, and various modifications can be implemented.

6. Power Receiving Unit and Charging Unit

Figure 19:
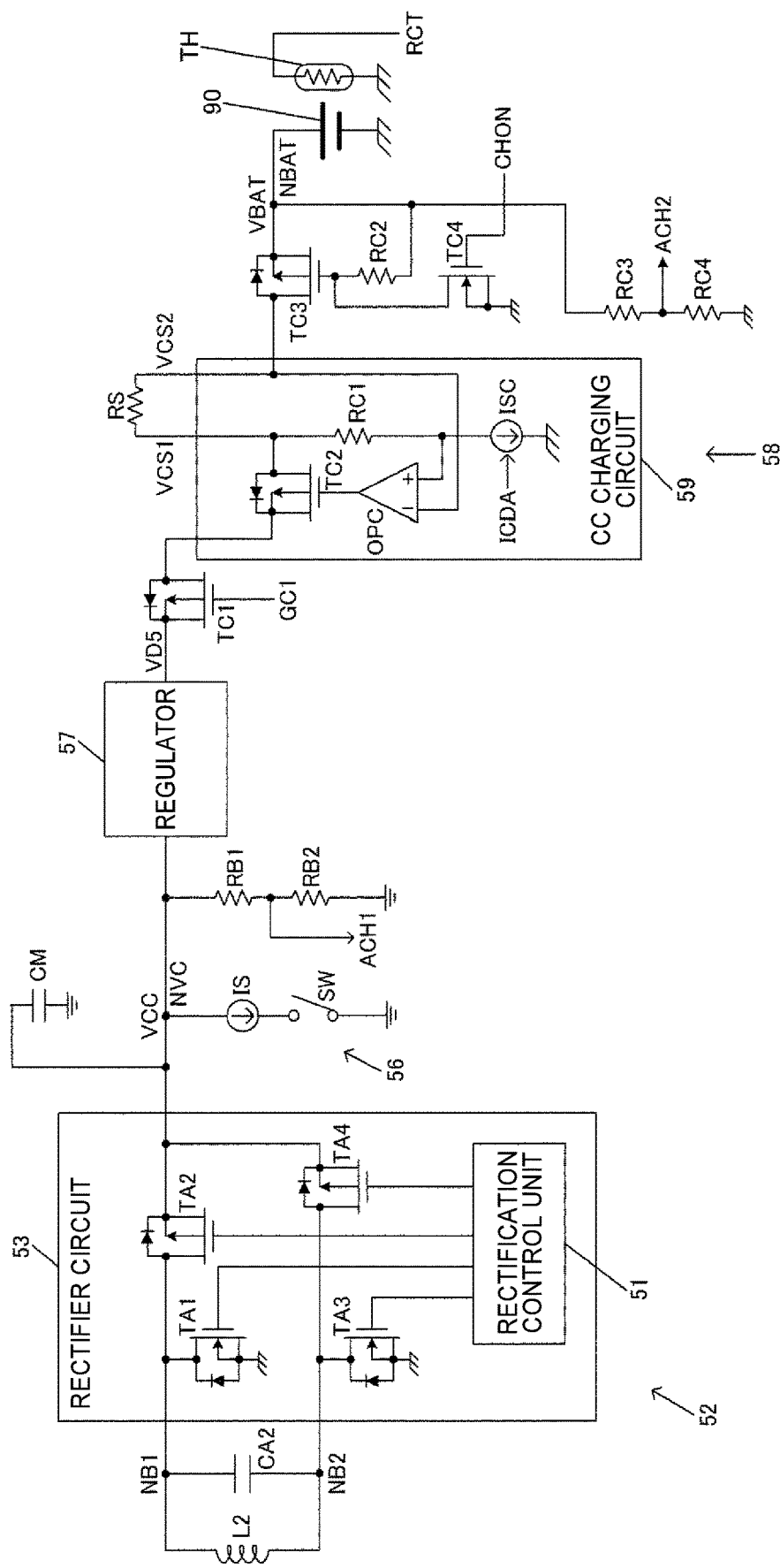
FIG. 19 illustrates detailed exemplary configurations of a power receiving unit and a charging unit.

A detailed exemplary configuration of the power receiving unit 52, the charging unit 58, and the like is shown in FIG. 19. The rectifier circuit 53 in the power receiving unit 52 includes transistors TA1, TA2, TA3, and TA4 for rectification and a rectification control unit 51 for controlling these transistors TA1 to TA4, as shown in FIG. 19.

The transistor TA1 is provided between a node NB1 which is one end of the secondary coil L2 and a GND (low potential side power supply voltage) node. The transistor TA2 is provided between the node NB1 and a node NVC of the rectified voltage VCC. The transistor TA3 is provided between a node NB2 which is the other end of the secondary coil L2 and the GND node. The transistor TA4 is provided between the node NB2 and the node NVC. A body diode is provided between a drain and a source of each of the transistors TA1 to TA4. The rectification control unit 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65 in FIG. 2, for example. Accordingly, monitoring of the rectified voltage VCC is made possible, and power control or the like based on the information of the rectified voltage VCC can be realized.

The regulator 57 performs voltage adjustment (regulation) on the rectified voltage VCC, and outputs a voltage VD5. The voltage VD5 is supplied to the CC charging circuit 59 in the charging unit 58 via a transistor TC1. The transistor TC1 is turned off with a control signal GC1 when an over-voltage of the charge voltage VBAT exceeding a predetermined voltage (4.25 V, for example) is detected. Note that circuits (circuits except for circuits in a discharging system such as the discharging unit 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. The transistor TC2 is controlled based on the output signal of the operational amplifier OPC. A non-inverting input terminal of the operational amplifier OPC is connected to one end of the resistor RC1. The other end of the resistor RC1 is connected to one end of a sense resistor RS that is provided as a component external to the control device 50. The other end of the sense resistor RS is connected to an inverting input terminal of the operational amplifier OPC. The current source ISC is provided between the non-inverting input terminal of the operational amplifier OPC and the GND node. The current that flows in the current source ISC is controlled based on a signal ICDA.

By virtual short of the operational amplifier OPC, the transistor TC2 is controlled such that the voltage on the one end of the resistor RC1 (non-inverting input terminal voltage) is equal to the voltage VCS2 on the other end of the sense resistor RS (inverting input terminal voltage). The current that flows in the current source ISC by the control of the signal ICDA is represented as IDA, and the current that flows in the resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible. A signal CHON is activated when charging is performed. Accordingly, the transistors TC3 and TC4 are turned on, and charging to the battery 90 starts. Also, reverse flow from the battery 90 is prevented by a resistor RC2 provided between a gate of the transistor TC3 and a node NBAT of the charge voltage VBAT or the like. Resistors RC3 and RC4 are provided in series between the node NBAT and the GND node, and a voltage ACH2 that is generated by voltage-dividing the charge voltage VBAT with the resistors RC3 and RC4 is input to the A/D converter circuit 65. Accordingly, monitoring of the charge voltage VBAT is made possible, and various types of control can be realized based on the charge state of the battery 90.

Also, a thermistor TH (temperature detection unit, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. Configurations, operations, or the like of the control devices on the power transmitting side and the power receiving side, the power transmitting device, the power receiving device are not limited to those described in this embodiment either, and various modifications can be implemented.

REFERENCE SIGNS LIST

L1 Primary coil
L2 Secondary coil
DR1, DR2 Transmission driver
CST Capacitor
TD1, TD2 First and second transistors
RD Resistor
SCT Schmitt trigger circuit
IVD Inverter
IS, ISC Current source
SW Switching element
CM Capacitor
IVC IV conversion amplifier
AP Amplifier
CP Comparator
TA1 to TA4, TC1 to TC4 Transistor
RCS, RS Sense resistor
RB1, RB2, RC1 to RC3 Resistor
OPC Operational amplifier
TH Thermistor (temperature detection unit)
10 Power transmitting device
12 Transmission unit
14 Power supply voltage control unit
16 Display unit
20 Control device
22 Driver control circuit
24 Control unit
30 Communication unit
32 Current detection circuit
34 Comparator circuit
35 Filter unit
36 Demodulation unit
37 Clock generation circuit
38 Oscillator circuit
40 Power receiving device
50 Control device
51 Rectification control unit
52 Power receiving unit
53 Rectifier circuit
54 Control unit
54C Charging system control unit
54D Discharging system control unit
55 Communication data generation unit
56 Load modulation unit
57 Regulator
58 Charging unit
59 CC charging circuit
60 Discharging unit
61 Charge pump circuit
62 Nonvolatile memory
64 Detection unit
70 Power-on reset circuit
72 Regulator
90 Battery
100 Power supply target
500 Charger
502 Power supply adapter
510 Electronic apparatus
514 Switch unit

The invention claimed is:

1. A control device on a power receiving side in a contactless power transmission system including a power transmitting device and a power receiving device, the control device comprising:

a charging unit that charges a battery based on power received by a power receiving unit that receives power from the power transmitting device;

a discharging unit that performs an operation of discharging the battery and supplies the power from the battery to a power supply target; and a control unit that controls the discharging unit,
wherein the control unit starts the discharging operation of the discharging unit to supply the power from the battery to the power supply target after both an output voltage of the power receiving unit has decreased below a judgment voltage and a start-up period of the discharging operation has elapsed,
wherein the control unit starts discharging of a capacitor, which is charged when the power receiving unit is receiving power, when the output voltage of the power receiving unit has decreased below the judgment voltage, and starts the discharging operation of the discharging unit when a charge voltage of the capacitor has decreased below a threshold voltage, and
wherein the control unit includes:
a first transistor for charging the capacitor; and
a second transistor for discharging the capacitor,
a control signal that is at a first voltage level when the output voltage of the power receiving unit is greater than or equal to the judgment voltage and at a second voltage level when the output voltage is less than the judgment voltage is input to the control unit,
when the control signal is at the first voltage level, the second transistor is turned off, and the first transistor is turned on, and as a result, the capacitor is charged, and
when the control signal is at the second voltage level, the first transistor is turned off, and the second transistor is turned on, and as a result, the capacitor is discharged.

2. A control device on a power receiving side in a contactless power transmission system including a power transmitting device and a power receiving device, the control device comprising:
a charging unit that charges a battery based on power received by a power receiving unit that receives power from the power transmitting device;
a discharging unit that performs an operation of discharging the battery and supplies the power from the battery to a power supply target;
a load modulation unit that transmits communication data to the power transmitting device by load modulation, and
a control unit that controls the discharging unit,
wherein the control unit starts the discharging operation of the discharging unit to supply the power from the battery to the power supply target after both an output voltage of the power receiving unit has decreased below a judgment voltage and a start-up period of the discharging operation has elapsed,
wherein the power transmitting device performs intermittent power transmission for removal detection,
wherein the start-up period is longer than an interval of the intermittent power transmission for removal detection, and
wherein the load modulation unit transmits the communication data including information for causing the power transmitting device to perform intermittent power transmission for removal detection by load modulation.

3. A control device on a power receiving side in a contactless power transmission system including a power transmitting device and a power receiving device, the control device comprising:
a charging unit that charges a battery based on power received by a power receiving unit that receives power from the power transmitting device;
a discharging unit that performs an operation of discharging the battery and supplies the power from the battery to a power supply target;
a load modulation unit that transmits communication data to the power transmitting device by load modulation; and
a control unit that controls the discharging unit,
wherein the control unit starts the discharging operation of the discharging unit to supply the power from the battery to the power supply target after both an output voltage of the power receiving unit has decreased below a judgment voltage and a start-up period of the discharging operation has elapsed,
wherein the control unit stops the discharging operation of the discharging unit when placement of the power receiving device on the power transmitting device is detected,
wherein the load modulation unit starts the load modulation when placement of the power receiving device on the power transmitting device is detected, and stops the load modulation when removal is detected.

4. The control device according to claim 1, wherein the control signal is a power-on reset signal.

5. The control device according to claim 2, wherein the load modulation unit transmits the communication data including at least one of detection information regarding full charge of the battery and detection information regarding an abnormality on the power receiving side as the information for causing the power transmitting device to perform the intermittent power transmission for removal detection.

6. The control device according to claim 3, wherein the control unit causes the discharging unit to perform the discharging operation in a removed period.

7. The control device according to claim 3, wherein the control unit performs detection of placement of the power receiving device on the power transmitting device and removal detection based on the output voltage of the power receiving unit.

8. An electronic apparatus comprising the control device according to claim 1.

9. A contactless power transmission system comprising a power transmitting device and a power receiving device, the system comprising a control device on a power receiving side according to claim 1.

10. A contactless power transmission system comprising a power transmitting device and a power receiving device, the system comprising a control device on a power receiving side according to claim 2.

11. A contactless power transmission system comprising a power transmitting device and a power receiving device, the system comprising a control device on a power receiving side according to claim 3.

* * * * *